US012645929B2

(12) United States Patent
Srivastava et al.

(10) Patent No.: US 12,645,929 B2
(45) Date of Patent: Jun. 2, 2026

(54) SYSTEMS AND METHODS FOR SEGREGATING MACHINE LEARNED MODELS FOR DISTRIBUTED PROCESSING

(71) Applicant: Aurora Operations, Inc., Pittsburgh, PA (US)

(72) Inventors: Kshitij Srivastava, Pittsburgh, PA (US); Nhiem Nguyen, Cranberry Township, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 1545 days.

(21) Appl. No.: 17/085,634

(22) Filed: Oct. 30, 2020

(65) Prior Publication Data

US 2022/0092412 A1      Mar. 24, 2022

Related U.S. Application Data

(60) Provisional application No. 63/082,179, filed on Sep. 23, 2020.

(51) Int. Cl.
*G06N 3/08* (2023.01)
*G05D 1/00* (2024.01)
(Continued)

(52) U.S. Cl.
CPC ............. *G06N 3/08* (2013.01); *G05D 1/0088* (2013.01); *G05D 1/0221* (2013.01); *H04L 67/10* (2013.01); *H04L 67/12* (2013.01)

(58) Field of Classification Search
CPC ............ G06N 3/08; G06N 5/022; G06N 3/04; G05D 1/0088; G05D 1/0221; H04L 67/10;
(Continued)

(56) References Cited

U.S. PATENT DOCUMENTS

2016/0105489 A1*   4/2016  Llorca ................... H04L 47/762
                                                      709/226
2020/0027354 A1*   1/2020  Goldman ....... G06Q 10/063118
(Continued)

OTHER PUBLICATIONS

TensorFlow, "TensorFlow Core v2.3.0 > Python", Sep. 24, 2020, https://www.tensorflow.org/api_docs/python/tf/compat/v1/graph_util/extract_sub_graph, retrieved on Oct. 30, 2020, 2 pages.

*Primary Examiner* — Imad Kassim
(74) *Attorney, Agent, or Firm* — Dority & Manning, P.A.

(57) ABSTRACT

Systems and methods of the present disclosure are directed to a method for editing a machine-learned model to facilitate distributed processing. The method can include obtaining a machine-learned graph model comprising a plurality of connected nodes. The method can include determining a plurality of processing capabilities for a respective plurality of computation resources. The method can include determining a plurality of portions from the machine-learned graph model, wherein each of the plurality of portions comprises a respective subset of the plurality of nodes and a minimum processing capability. The method can include assigning each of the plurality of portions to a respective computation resource of the plurality of computation resources based at least in part on the minimum processing capability of a respective portion and the processing capability of the respective computation resource.

19 Claims, 10 Drawing Sheets

(51) Int. Cl.
   *H04L 67/10*      (2022.01)
   *H04L 67/12*      (2022.01)

(58) Field of Classification Search
   CPC ... H04L 67/12; B60W 2556/45; B60W 50/06;
           B60W 2050/0006; B60W 50/0098; B60W
                               60/00
   See application file for complete search history.

(56)                  References Cited

U.S. PATENT DOCUMENTS

2020/0064842 A1*  2/2020  Kentley-Klay ........ G07C 5/008
2021/0064338 A1*  3/2021  Emmart ..................... G06F 7/57
2021/0232912 A1*  7/2021  Sharma .................... G06N 3/08
2021/0273858 A1*  9/2021  Radovanovic ......... G06Q 50/06
2021/0286650 A1*  9/2021  Henry ...................... G06N 3/09
2021/0319272 A1* 10/2021  Gaidon ................. G06V 10/82
2021/0380126 A1* 12/2021  Liu .......................... G06N 5/02

* cited by examiner

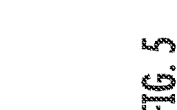

FIG. 5

PORTION 2 518
SENSOR DATA 1 INPUT 504
SENSOR DATA 2 PREPROCESSING 508
FP16

PORTION 4 522
POST. PROCESSING/OUTPUT 512
INT8

COMP. RESOURCE 4 532
INT8

RESOURCE ASSIGNMENT
524

PORTION 3 520
FUSED SEGMENTATION 510
FP32

COMP. RESOURCE 2 528
FP16

PORTION 1 516
SENSOR DATA 1 INPUT 502
SENSOR DATA 1 PREPROCESSING 506
MATH OPS 507
FP32

COMP. RESOURCE 3 530
FP32

501

PORTION DETERMINATION
514

COMP. RESOURCE 1 526
FP32

SENSOR DATA 2 INPUT 504
SENSOR DATA 2 PREPROCESSING 508

SENSOR DATA 1 INPUT 502
SENSOR DATA 1 PREPROCESSING 506
MATH OPS 507

FUSED TRUNK 510

POST-PROCESSING/OUTPUT 512

PORTION ASSIGNMENT DATA 534

500

600A

602 — OBTAINING A MACHINE-LEARNED GRAPH MODEL

604 — DETERMINING A PLURALITY OF PROCESSING CAPABILITIES FOR A PLURALITY OF COMPUTATION RESOURCES

606 — DETERMINING A PLURALITY OF MACHINE-LEARNED PORTIONS FROM THE GRAPH MODEL

608 — ASSIGNING THE PLURALITY OF PORTIONS TO THE PLURALITY OF COMPUTATION RESOURCES

B

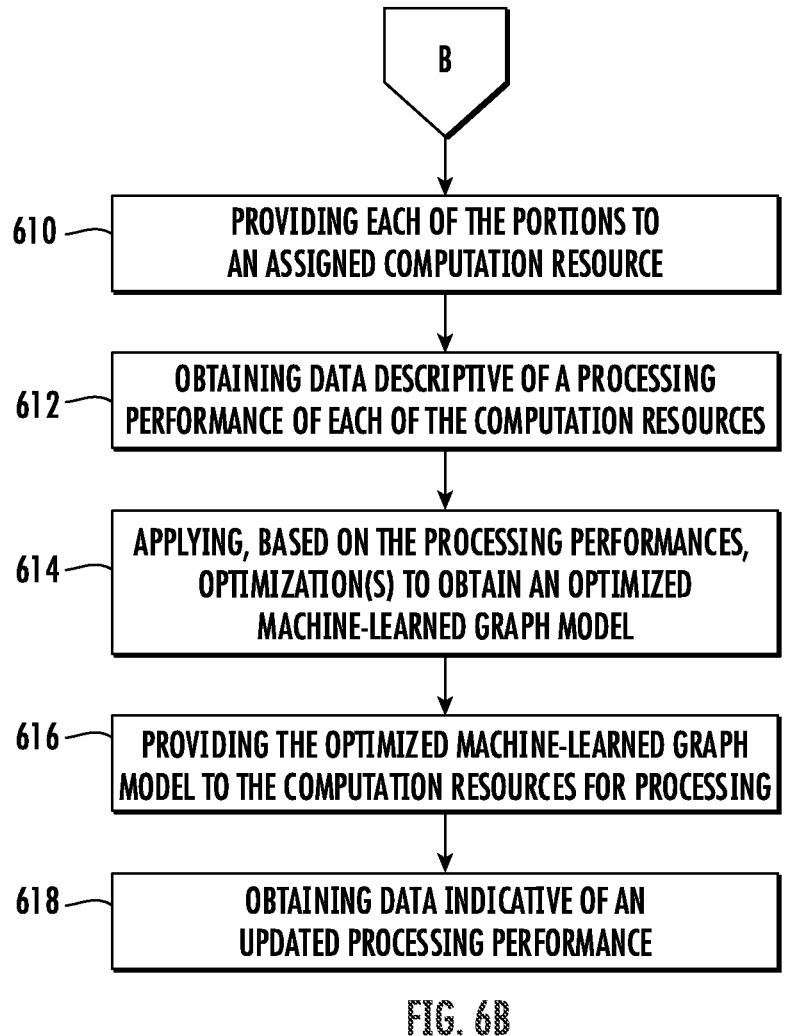

610 — PROVIDING EACH OF THE PORTIONS TO AN ASSIGNED COMPUTATION RESOURCE

612 — OBTAINING DATA DESCRIPTIVE OF A PROCESSING PERFORMANCE OF EACH OF THE COMPUTATION RESOURCES

614 — APPLYING, BASED ON THE PROCESSING PERFORMANCES, OPTIMIZATION(S) TO OBTAIN AN OPTIMIZED MACHINE-LEARNED GRAPH MODEL

616 — PROVIDING THE OPTIMIZED MACHINE-LEARNED GRAPH MODEL TO THE COMPUTATION RESOURCES FOR PROCESSING

618 — OBTAINING DATA INDICATIVE OF AN UPDATED PROCESSING PERFORMANCE

FIG. 6B

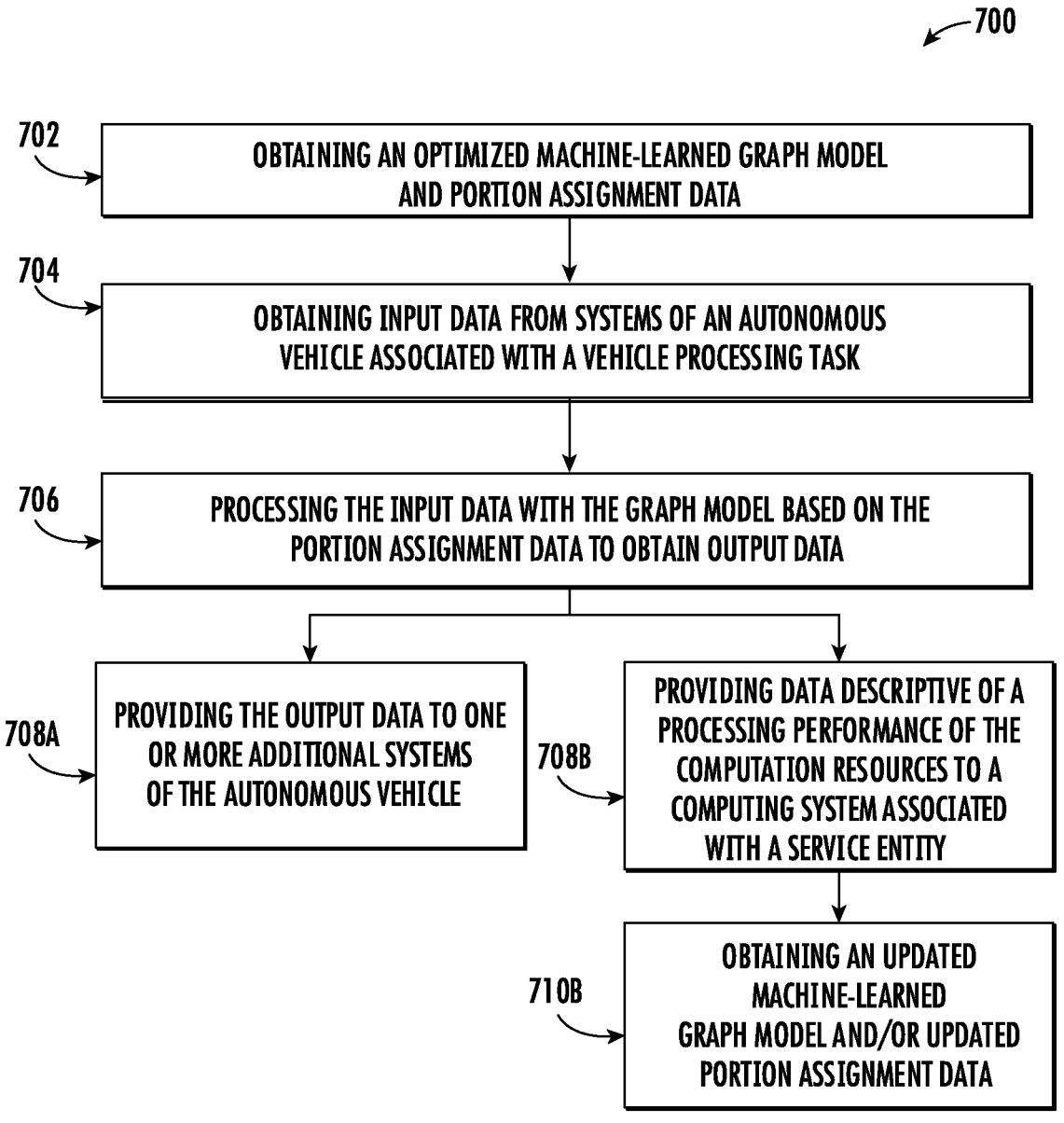

702 → OBTAINING AN OPTIMIZED MACHINE-LEARNED GRAPH MODEL AND PORTION ASSIGNMENT DATA

704 → OBTAINING INPUT DATA FROM SYSTEMS OF AN AUTONOMOUS VEHICLE ASSOCIATED WITH A VEHICLE PROCESSING TASK

706 → PROCESSING THE INPUT DATA WITH THE GRAPH MODEL BASED ON THE PORTION ASSIGNMENT DATA TO OBTAIN OUTPUT DATA

708A → PROVIDING THE OUTPUT DATA TO ONE OR MORE ADDITIONAL SYSTEMS OF THE AUTONOMOUS VEHICLE

708B → PROVIDING DATA DESCRIPTIVE OF A PROCESSING PERFORMANCE OF THE COMPUTATION RESOURCES TO A COMPUTING SYSTEM ASSOCIATED WITH A SERVICE ENTITY

710B → OBTAINING AN UPDATED MACHINE-LEARNED GRAPH MODEL AND/OR UPDATED PORTION ASSIGNMENT DATA

FIG. 7

COMPUTING SYSTEM 800

GRAPH MODEL OBTAINING UNIT(S) — 805

PROCESSING CAPABILITY DETERMINATION UNIT(S) — 810

PORTION DETERMINATION UNIT(S) — 815

PORTION ASSIGNING UNIT(S) — 820

SYSTEMS AND METHODS FOR SEGREGATING MACHINE LEARNED MODELS FOR DISTRIBUTED PROCESSING

RELATED APPLICATION

The present application is based on and claims benefit of U.S. Provisional Patent Application No. 63/082,179 having a filing date of Sep. 23, 2020, which is incorporated by reference herein.

FIELD

The present disclosure relates generally to efficient processing of machine learned models, and, more particularly, segregation of machine learned models for optimized distributed processing.

BACKGROUND

An autonomous vehicle can be capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such a surrounding environment

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for editing a machine-learned model to facilitate distributed processing. The method can include obtaining, by a computing system comprising one or more computing devices, a machine-learned graph model comprising a plurality of connected nodes. The method can include determining, by the computing system, a plurality of processing capabilities for a respective plurality of computation resources. The method can include determining, by the computing system, a plurality of portions from the machine-learned graph model, wherein each of the plurality of portions comprises a respective subset of the plurality of nodes and a minimum processing capability. The method can include assigning, by the computing system, each of the plurality of portions to a respective computation resource of the plurality of computation resources based at least in part on the minimum processing capability of a respective portion and the processing capability of the respective computation resource.

Another aspect of the present disclosure is directed to a computing system of an autonomous vehicle. The computing system can include a plurality of computation resources comprising a respective plurality of processing capabilities. The computing system can include one or more tangible, non-transitory computer readable media storing computer-readable instructions that when executed by at least one of the plurality of computation resources cause the at least one of the plurality of computation resources to perform operations. The operations can include obtaining an optimized machine-learned graph model comprising a plurality of portions and portion assignment data descriptive of an assignment of each of the plurality of portions to a respective computation resource of the plurality of computation resources, wherein the plurality of portions are associated with a respective plurality of minimum processing capabilities, wherein the portion assignment data is based at least in part on the plurality of processing capabilities and the plurality of minimum processing capabilities. The operations can include obtaining input data from one or more systems of the autonomous vehicle, wherein the input data is associated with an autonomous vehicle processing task. The operations can include processing the input data with the optimized machine-learned graph model based at least in part on the portion assignment data to obtain output data associated with the autonomous vehicle processing task. The operations can include providing the output data to one or more additional systems of the autonomous vehicle.

Another example aspect of the present disclosure is directed to one or more tangible, non-transitory computer readable media storing computer-readable instructions that when executed by one or more processors cause the one or more processors to perform operations. The operations can include obtaining a graph model comprising a plurality of connected nodes. The operations can include determining a plurality of processing capabilities for a respective plurality of computation resources. The operations can include determining a plurality of portions from the graph model, wherein each of the plurality of portions comprises a respective subset of the plurality of nodes and a minimum processing capability. The operations can include assigning each of the plurality of portions to a respective computation resource of the plurality of computation resources based at least in part on the minimum processing capability of a respective portion and the processing capability of the respective computation resource. The operations can include providing each of the plurality of portions to a respective computation resource to which the portion is assigned, wherein the respective computation resource is configured to process the respective portion.

Other example aspects of the present disclosure are directed to other systems, methods, apparatuses, and the like for machine learning optimization, model-hardware deployment, and autonomous systems operations.

The machine learning technology described herein can help improve the efficiency of computing systems and reduce compute times. Moreover, the machine learning technology of the present disclosure can allow for systems utilizing it (e.g. autonomous vehicle computing systems) to make more calculations and thus, provide more data within a certain time interval compared to a system without. For example, in some embodiments, an autonomous vehicle computing system would be able to complete predictive calculations regarding driving operations (e.g. left turn, right turn, accelerate, brake, etc.) in less time than current embodiments and provide for a more accurate and safer operation.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 5 depicts a data flow diagram for determining and assigning portions of a graph model to computation resources of a computing system according to example embodiments of the present disclosure;

FIG. 6B depicts a flowchart of a method for optimizing one or more portions of a segregated model to obtain an optimized machine-learned model according to example embodiments of the present disclosure;

FIG. 7 depicts a flowchart of a method for distributed processing of a segregated and optimized machine-learned graph model according to example embodiments of the present disclosure;

DETAILED DESCRIPTION

Figure 1:
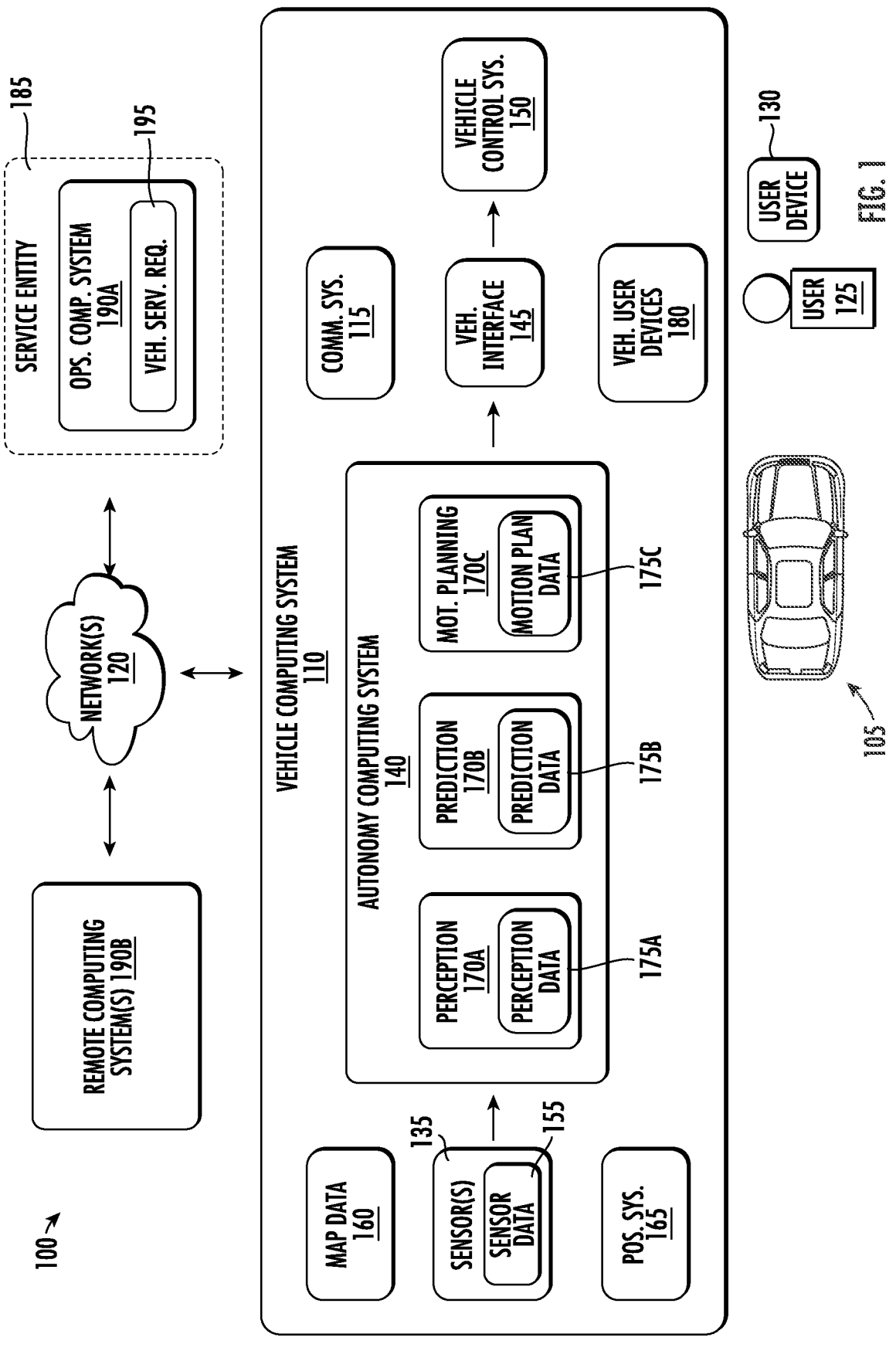
FIG. 1 depicts a block diagram of an example autonomous vehicle computing system according to example embodiments of the present disclosure.

Example aspects of the present application are directed to distributed processing of machine-learned models. More particularly, the systems and methods of the present disclosure provide a method to segregate a machine-learned graph model into portions (e.g., portions of the model), and provide these portions to distributed computation resources (e.g., physical and/or virtualized CPU(s), ASIC(s), FPGA(s), etc.). As an example, a machine-learned graph model (e.g., a graph-based neural network, etc.) can be obtained that includes a plurality of connected nodes (e.g., neuron(s) of a neural network, neural network(s), etc.). The machine-learned graph model can be segregated into various portions, which can each require a minimum processing capability (e.g., a minimum floating point precision, computation bandwidth, etc.). After segregating these portions of the model, a processing capability can be determined for a plurality of computation resources (e.g., discrete processor(s) onboard an autonomous vehicle computing system, etc.). Based on the required minimum processing capability for the portions, and the processing capability of the computation resources, each of the portions can be assigned to a respective computation resources for future processing, and in some implementations can be further optimized for their assigned computation resource. In such fashion, systems and methods of the present disclosure can be utilized to segregate and assign portions of a machine-learned model to hardware resources of various capabilities to optimally facilitate distributed processing of the machine-learned model.

More particularly, a computing system can obtain a graph model. As an example, the computing system can be a computing system associated with a service entity (e.g., a facilitator of autonomous vehicle services, etc.). The graph model can be, for example, a machine-learned graph model. A machine-learned graph model can be a machine-learned graph neural network that can be utilized to perform at least a portion of the computations required to facilitate operation of an autonomous vehicle (e.g., perception operation(s), prediction operation(s), motion planning operation(s), etc.). The graph model can be one that is ultimately implemented on an autonomous vehicle for performing the autonomy functions of the autonomous vehicle. It should be noted that each of the connected nodes of the graph model can include one or more neural unit(s) (e.g., neuron(s), layer(s), portion(s), etc.) of a neural network, and/or can include one or more neural network(s). Additionally, in some implementations, the portion(s) can include deterministic operation(s) and/or algorithm(s) that are not necessarily machine-learned (e.g., pre-processing operation(s), mathematical operation(s), post-processing algorithm(s), etc.).

It should be noted that although the present disclosure is described primarily in the context of facilitating autonomous vehicle operations for an autonomous vehicle computing system, aspects of the present disclosure are not limited to this context. Rather, systems and methods of the present disclosure can provide segregation of a machine-learned graph model that is trained for any purpose. As an example, systems and methods of the present disclosure can be used to segregate a machine-learned graph model for backend operations across a system of distributed processing devices (e.g., cloud-based image processing, route planning, service optimization, vehicle distribution, statistical analysis, etc.). As another example, systems and methods of the present disclosure can be used to segregate a graph that includes a plurality of machine-learned models across a plurality of computing systems (e.g., assignment of a plurality of machine-learned models that are components of a directed graph based processing architecture). In such fashion, systems and methods of the present disclosure can be applied in a broad variety of machine-learning applications to more facilitate segregation, assignment, and optimization of machine-learned models to various computation resources for distributed processing.

To help facilitate the model-hardware segregation, the computing system can identify the available hardware resources of a computing system (e.g., the same computing system, a vehicle computing system, etc.). For instance, the computing system can determine a plurality of processing capabilities for a respective plurality of computation resources. A computation resource can include at least a portion of any physical or virtual computation devices (e.g., processors, processor cores, memory devices, application-specific integrated circuits, graphics processing units, tensor processing unit(s), field-programmable gate arrays, accelerators, etc.). Each of the computation resources can include and/or be associated with a processing capability (e.g., a floating point precision, a processing throughput, an output accuracy, a processing latency, etc.). As an example, a vehicle computing system can include a processor with a plurality of processing cores (e.g., sixteen processing cores, etc.), a large graphics processing unit (GPU), a small GPU, and a field-programmable gate array (FPGA). A first computational resource may include the large GPU, and the large GPU can be capable of performing processing operations at a very high accuracy (e.g., a floating point precision of 32 bits (FP32), a relatively large FP32 processing throughput, etc.), therefore providing a high level of processing capability. A second computational resource may include the FPGA, and the FPGA can be capable of performing processing operations at an accuracy and/or speed less than the GPU (e.g., a precision of 8 bits (INT32), a relatively small INT8 processing throughput, etc.), therefore providing the second computation resource with a processing capability less than the first computation resource. As such, the physical and/or virtual processing devices of computation resources can vary, and the processing capabilities of the computation resources can vary accordingly.

In some implementations, the processing capability of a computation resource can be based at least in part on the location of a computation resource within a computing system. As an example, a computation resource can be located closer to certain resources of the computing system (e.g., certain level(s) of memory, etc.) can have a higher processing capability than a computation resource located further from the resources. As such, the positioning and/or access to certain portions of a computing system can at least partially determine the processing capability of a computation resource.

In some implementations, a computation resource can include a portion of a physical or virtual processing device. As an example, a first computation resource can be or otherwise include the tensor cores of a graphics processing unit, and a second computation resource can be or otherwise include the compute unified device architecture (CUDA) cores of a graphics processing unit. As another example, a first computation resource can be or otherwise include virtualized processor core(s) executed by a core of a physical CPU while a second computation resource can be or otherwise include additional virtualized processor cores(s) provided by the processor core and/or additional processor core(s) of the CPU. As such, a computation resource can include any portion and/or number of physical and/or virtualized processing device(s).

To help better allocate the graph model to the various computation resources, the computing system can separate the graph model into a plurality of portions. For instance, a plurality of portions can be determined from the machine-learned graph model. More particularly, the machine-learned graph model can be segregated (e.g., "cut") at certain points to determine a plurality of portions of the machine-learned graph model. As an example, the machine-learned graph model can be or otherwise include a machine-learned graph neural network that includes a plurality of connected nodes. Subsets of the nodes can be cut away from the graph neural network to form portions of the network. For example, the machine-learned graph neural network can include 5 nodes, and a first portion can include the first two nodes and a portion can include the last three nodes. It should be noted that the segregation of node subsets from the machine-learned graph model can be performed using any conventional machine-learning tools and/or libraries (e.g., a deep learning library with graph network support, etc.).

Each of the portions of the machine-learned graph model can be associated with a minimum processing capability. The minimum processing capability can be a level of processing capability for a computation resource required to process the portion. In some implementations, the minimum processing capability can be described using the same metrics as the processing capability of the computation resources (e.g., a floating point precision, a processing throughput, a processing latency, etc.). In some implementations, the minimum processing capability can be described using different metrics than the processing capability of the computation resources. The computing system can be configured to translate the metric(s) associated with at least one of the minimum processing capability and/or the processing capability of the computation resources in order to help compare/match these elements.

In some implementations, the plurality of nodes of the machine-learned graph model can each be connected to at least one other node of the plurality of nodes. Further, in some implementations, each of the plurality of nodes can include one or more neural units of a neural network. As an example, a node of the machine-learned graph model may include one or more neurons (e.g., a single neuron, a layer of neurons from the graph model, a plurality of layers of neurons, etc.). As another example, a node of the machine-learned graph model may include one or more machine-learned functions (e.g., an activation layer, etc.). As yet another example, a node of the machine-learned graph model may be configured to perform one or more algorithms on received data (e.g., image preprocessing, etc.).

In some implementations, the subset of nodes of a portion of the machine-learned graph model may include nodes of differing minimum processing capabilities. As an example, a first node of the subset of nodes may have a minimum processing capability including a floating point precision of 16 bits. A second node of the subset of nodes may have a minimum processing capability including a floating point precision of 32 bits. In some implementations, the minimum processing capability of the portion itself can be that of the highest individual node of its subset of nodes. To follow the previous example, the portion including the first node and the second node could have a minimum processing capability including a floating point precision of 32 bits. Alternatively, in some implementations, each node of a subset of nodes of a portion of the machine-learned graph model can have identical minimum processing capabilities.

In some implementations, the segmentation of the model to form the portions (e.g., the subsets of nodes) can be based on the minimum accuracy and/or speed required to perform the operations of the subsets of nodes. As an example, if each of the operations in a subset of nodes requires a floating point precision of FP32, the subset of nodes can be "cut" to be included in a portion so that the entire subset of nodes can be processed by a computation resource capable of processing at a precision of FP32. As another example, a first subset of nodes can have an associated processing latency. A second subset of nodes can be "cut" to be included in a second portion such that a third portion of nodes can receive the outputs of the first and second portions at an optimal time. More particularly, the subset of nodes can be included in the portion to minimize and/or optimize the latency of the distributed processing of the machine-learned graph model.

Based on the minimum processing capabilities of the portions and the processing capabilities of the computation resources, each of the plurality of portions can be assigned to a respective computation resource of the plurality of computation resources. As an example, a first portion can have a minimum processing capacity that includes a minimum floating point precision of 32 bits, while a second portion can have a minimum floating point precision of 16 bits. A first computation resource can have a processing capability that includes a maximum floating point precision of 16 bits. A second computation resource can have a processing capability that includes a maximum floating point precision of 32 bits. The first portion can be assigned to the second computation resource and the second portion can be assigned to the first computation resource. In such fashion, each of the computation resources can be utilized to an optimal degree to process portions of the machine-learned graph model.

In some implementations, one or more connections can be generated between each of the portions to obtain a reconstructed machine-learned graph model. More particularly, the connections between nodes of the machine-learned graph model (e.g., the connections between the subsets of the nodes) can be restored to reconstruct the machine-learned graph model for processing. After obtaining the reconstructed machine-learned graph model, the model can be provided to the plurality of computation resources. The plurality of computation resources can be configured to process the reconstructed machine-learned graph model (e.g., according to the assignment of the portions to the each of the computation resources, etc.).

Alternatively, or additionally, in some implementations, each of the plurality of machine-learned portions can be provided to a respective computation resource to which the machine-learned portion is assigned. Each of the computation resources can be configured to process an assigned portion of the machine-learned graph model. In such fashion, the segregated machine-learned graph model (e.g., the plurality of portions) can be provided to the plurality of hardware resources for optimal distributed processing.

In some implementations, the computing system can obtain data descriptive of a processing performance of each of the computation resources. The processing performance can describe one or more processing metrics (e.g., a processing latency, a processing bandwidth, an accuracy of output data associated with the processing, etc.). As an example, the data descriptive of the processing performance may indicate that the output data from processing a portion by a computation resource was not accurate enough to facilitate proper operations (e.g., of an autonomous vehicle task, etc.). As another example, the data descriptive of the processing performance may indicate that the output data from processing of a portion by a computation resource can be less accurate and still facilitate proper operations. As such, the data descriptive of the processing performances can be utilized to further optimize the structure of the portions and/or the assignment of portions to computation resources.

In some implementations, one or more optimizations can be applied to one or more respective portions to obtain an optimized machine-learned graph model. The one or more optimizations can be based at least in part on the processing performance of the one or more computation resources assigned to process the one or more portions of the machine-learned graph model. The optimization(s) can include adjusting the minimum processing capability of the portion(s) and/or compressing a subset of nodes of the portion(s). As an example, a processing performance of a first computation resource assigned to a first portion may indicate that an output of the computation resource can be less accurate and can still facilitate proper operations. In response, the first portion can be optimized. For example, the subset of nodes of the first portion can be compressed (e.g., compressing layer(s) of a neural network, combining the operations of two nodes into one node, etc.). For another example, the minimum processing capability of the first portion can be reduced (e.g., reduced from a 32-bit floating point minimum precision to a 16-bit floating point minimum precision, etc.).

In some implementations, the one or more optimizations can be further based at least in part on an autonomous vehicle processing task respectively associated with the machine-learned portion. More particularly, the optimizations can be based on the proposed autonomous vehicle task output assigned to the portion of the machine-learned graph model. As an example, a portion may be associated with a data processing task and/or data preprocessing task (e.g., LIDAR data preprocessing and/or processing, image data preprocessing and/or processing, etc.). As another example, a portion may be associated with a task (e.g., image segmentation, LIDAR segmentation, fused segmentation, detection, estimation, etc.). As yet another example, a portion may be associated with one or more mathematical operations. It should be noted that, in some implementations, the optimization(s) can occur either before or after the graph model is reconnected.

The optimized graph model can be implemented onboard an autonomous vehicle. For example, an onboard computing system of an autonomous vehicle (e.g., an autonomous vehicle computing system, etc.) can include a plurality of computation resources that include a respective plurality of processing capabilities. The computation resources and associated processing capabilities can be the same or substantially similar to those described previously. The computing system can obtain an optimized machine-learned graph model (e.g., optimized according to the systems and methods of the present disclosure, etc.). For example, the graph model may be accessed, received, retrieved, downloaded, stored, etc. onto the autonomous vehicle computing system (e.g., from an offboard repository, etc.). The graph model can include the plurality of portions, and can further include and/or be obtained in association with portion assignment data. The portion assignment data can describe an assignment of each of the portions to a respective computation resource.

The portion assignment data can be based at least in part on the plurality of processing capabilities of the computation resources and a minimum processing capability for each of the portions of the model. More particularly, the assignment data can include assignments of the portions to various computation resources such that the portions are assigned to computation resources that are sufficiently capable of processing the assigned portions. As an example, the portion assignment data can describe an assignment of a first portion with a minimum processing capability including a floating point precision of 32 bits to a computation resource with a processing capability including a floating point precision of 32 bits.

The computing system of the autonomous vehicle can obtain input data from one or more systems of the autonomous vehicle (e.g., a perception system, a prediction system, a motion planning system, a remote computing system, an operations computing system, a sensor system, a secondary vehicle computing system, an autonomy computing system, etc.). The input data can be associated with an autonomous vehicle task. As an example, the input data can be associated with a perception task (e.g., a task to perceive an environment about the autonomous vehicle, etc.). As another example, the input data can be associated with a prediction task (e.g., a task to predict future event(s) regarding the environment or one or more objects about the autonomous vehicle, etc.). As yet another example, the input data can be associated with a motion planning task (e.g., a task to plan the motion of the vehicle in response to perceived and/or predicted event(s) regarding the environment or one or more objects about the autonomous vehicle, etc.).

The computing system of the autonomous vehicle can process the input data with the optimized machine-learned graph model based at least in part on the portion assignment data to obtain output data. The output data can be associated with the autonomous vehicle processing task. As an example, the autonomous vehicle processing task can be a perception task and the output data can be perception data (e.g., identification of object(s) in an environment about the autonomous vehicle, etc.). As another example, the autonomous vehicle processing task can be a prediction task and the output data can be prediction data (e.g., predicted movement of the one or more objects perceived in the environment about the autonomous vehicle, etc.). As yet another example, the autonomous vehicle processing task can be a motion planning task and the output data can be motion planning data (e.g., data to control motion of the autonomous vehicle in response to the predicted movement of object(s) perceived to be in the environment about the autonomous vehicle, etc.).

In some implementations, the computing system can process the input data with the optimized machine-learned graph model by processing each portion of the model with the computation resource that is assigned to each portion by the portion assignment data. As an example, a first portion can be assigned to a first computation resource and a second portion can be assigned to a second computation resource. The first portion can be processed with the first computation resource and the second portion can be processed by the second computation resource.

The output data can be provided to one or more additional systems of the autonomous vehicle. As an example, the motion planning data can be provided to a vehicle control system (e.g., and/or an associated intermediate interface, etc.) of the autonomous vehicle to control the autonomous vehicle in accordance with the motion planning data. The various system(s) of the autonomous vehicle will be discussed in greater detail with regards to FIG. 1.

In some implementations, data descriptive of a processing performance of the computation resources can be provided to a computing system associated with a service entity. Further, the autonomous vehicle processing task can be associated with a service provided and/or facilitated by the service entity. As an example, the service entity can facilitate an autonomous vehicle service (e.g., a transportation service, delivery service, rideshare service, etc.). The autonomous vehicle task can be associated with the autonomous vehicle service (e.g., a motion planning task for operating the autonomous vehicle to fulfill the autonomous vehicle service). The computing system to which the data is provided can be associated with the service entity. For example, the computing system may be a computing system utilized by the service entity to optimize the optimized machine-learned graph model and to generate the portion assignment data (e.g., according to the methods of the present disclosure, etc.).

In some implementations, in response to providing the data descriptive of the processing performance, the computing system of the autonomous vehicle can obtain an updated machine-learned graph model different from the first optimized model and/or updated portion assignment data different than the portion assignment data. As an example, the provided data may indicate a poor processing performance associated with the processing of a first portion by a first computation resource. In response, the updated assignment data can reassign the first portion to a different computation resource. Alternatively, or additionally, the updated machine-learned graph model may include further optimizations to the optimized model. To follow the previous example, the updated machine-learned graph model may include an increased minimum processing capability for the first portion and/or may have compressed the first portion (e.g., consolidated one or more neural network layers, reassigned one or more neural units from the first portion to a different portion, etc.).

Various means can be configured to perform the methods and processes described herein. For example, a computing system can include graph model obtaining unit(s), processing capability determination unit(s), portion determination unit(s), portion assigning unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain a graph model (e.g., a machine-learned graph neural network, etc.). A graph model obtaining unit is an example of means for obtaining a machine-learned graph model as described herein.

The means can be configured to determine a processing capability for a plurality of a respective plurality of computation resources. For example, the means can be configured to determine that each of a plurality of computation resources has a certain processing capability. A processing capability determination unit is one example of a means for determining a processing capability for a plurality of a respective plurality of computation resources as described herein.

The means can be configured to determine a plurality of portions from a machine-learned graph model. For example, the means can be configured to segregate a machine-learned graph neural network into subsets of network nodes. A portion determination unit is one example of a means for determining a plurality of portions from a machine-learned graph model as described herein.

The means can be configured to assign a plurality of portions of a machine-learned graph model to a plurality of computation resources. For example, the means can be configured to assign each of the plurality of machine-learned portions to a respective computation resource of the plurality of computation resources. A portion assigning unit is one example of a means for assigning a plurality of portions of a machine-learned graph model to a plurality of computation resources as described herein.

The present disclosure provides a number of technical effects and benefits. As one example technical effect and benefit, the systems and methods of the present disclosure enable more optimal usage of computation resources in a computing system (e.g., various physical and/or virtual processing resources of an autonomous vehicle computing system, etc.). As an example, computation resources are often under-utilized due to a lack of perceived accuracy when processing machine-learned models. For example, a relatively accurate computation resource (e.g., a graphics processing unit) may perform most or all of the processing of a machine-learned graph model while a relatively inaccurate computation resource (e.g., an FPGA) would inefficiently sit idle. By segregating a machine-learned model into portions, and determining a minimum processing capability for each portion, various portions can be distributed to each of the computation resources in the computing system, therefore significantly increasing utilization of all computation resources in a system and decreasing inefficiencies such as unused computation resources sitting idle. In turn, this increase in resource utilization can lead to lower hardware costs, reduced processing latency, and increased processing accuracy, which in the context of autonomous vehicles can be utilized to further ensure the absolute safety of passengers.

With reference now to the FIGS., example aspects of the present disclosure will be discussed in further detail. FIG. 1 depicts a block diagram of an example system 100 for controlling and communicating with a vehicle according to example aspects of the present disclosure. As illustrated, FIG. 1 shows a system 100 that can include a vehicle 105 and a vehicle computing system 110 associated with the vehicle 105. The vehicle computing system 100 can be located onboard the vehicle 105 (e.g., it can be included on and/or within the vehicle 105).

The vehicle 105 incorporating the vehicle computing system 100 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical take-off and lift (VTOL) aircraft, etc.). The vehicle 105 can be a light weight elective vehicle (e.g., bicycle, scooter, etc.). The vehicle 105 can be another type of vehicles (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105. For example, the vehicle computing system 110 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. It should be noted that the computing devices located onboard the vehicle 105 can be or otherwise be included in computation resources of the vehicle computing system 110. As an example, a computation resource of the vehicle computing system can include one or more computing devices. In some implementations, a computing device of the vehicle computing system 110 can be included in multiple computation resources. As an example, a first portion of a computing device (e.g., the tensor cores of a graphics processing unit, a core of a multicore CPU, etc.) can be or otherwise be included in a first computation resource. A second portion of the computing device (e.g., the CUDA cores of a graphics processing unit, a virtualized CPU or CPU core, etc.) can be included in a second computation resource. As such, the vehicle computing system 110 can include a plurality of computation resources, each computation resource including at least a portion of one or more computation devices (e.g., a portion of a GPU, multiple GPUs, a GPU and a portion of a CPU, etc.).

The computing device(s) and/or computation resources of the vehicle computing system can include various components for performing various operations and functions. As an example, the computing device(s) can include one or more application-specific integrated circuit(s), memory(s), processor(s), processor core(s), field-programmable gate array(s), accelerator(s), tensor processing unit(s), graphics processing unit(s), and/or any other computing devices to facilitate the operation of the aforementioned device(s) (e.g., a printed circuit board, motherboard, power supply, etc.). In some implementations, the vehicle computing system 110 can be partitioned into a plurality of independent, asymmetrically-powerful computation resources that each include one or more computation devices. Each of the computation resources can be configured to fully process the operations of a task at varying accuracies and/or speeds due to the difference in computing device(s) included in the various computation resources. As an example, a first computation resource can obtain data associated with a first task and generate an associated task output faster than a second computation resource due to an increased number of graphics processing units included in the first computation resource. As such, two computation resources of the vehicle computing system 110 can include varying amounts or types of computing device(s) and/or portion(s) of computing device(s).

Each of the computing device(s), and therefore each of the computation resources, of the vehicle computing system 110 can have or be associated with a certain processing capability (e.g., a floating point precision, a processing throughput, a processing latency, etc.). As an example, the vehicle computing system 110 can include a processor with a plurality of processing cores (e.g., sixteen processing cores, etc.), a large graphics processing unit (GPU), a small GPU, and a field-programmable gate array (FPGA). A first computational resource may include the large GPU and a corresponding processing capability provided by the relatively high accuracy and throughput of a GPU (e.g., a floating point precision of 32 bits (FP32), a relatively large FP32 processing throughput, etc.). A second computational resource may include the FPGA a corresponding processing capability provided by the relatively low accuracy and throughput of the FPGA (e.g., a precision of 8 bits (INT8), a relatively small INT8 processing throughput, etc.). As such, the physical and/or virtual processing devices of a computation resources can vary, and the processing capabilities of the computation resources can vary accordingly.

The computing device(s) and/or computation resources can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for segregation, distribution, and optimization of a machine-learned model (e.g., a graph model, etc.) across a number of computation resources included in the vehicle 105 (e.g., the one or more computing devices included in the vehicle computing system 110, etc.).

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

More particularly, the vehicle computing system 110 may send data to and/or receive data from an operations computing system 190A via network(s) (e.g., using communication system 115, etc.). As an example, the operations computing system 190A can send a graph model (e.g., an optimized machine-learned graph model, etc.) including a plurality of portions to the vehicle computing system 110 alongside portion assignment data. The portion assignment data can describe an assignment of each of the plurality of portions to a respective computation resource of the vehicle computing system 110. The vehicle computing system 110 can also receive input data that is associated with an autonomous vehicle processing task (e.g., perception data 175A for a perception task 170A, prediction data 175B for a prediction task 170B, motion planning data 175C for a motion planning task 170C, etc.). The vehicle computing system 110 can process the input data using the portions of the graph model according to the portion assignment data to obtain output data that is associated with the autonomous vehicle processing task.

As an example, the graph model can be a graph model configured to process motion planning data 175C to output a motion plan. Portions of the graph model can be assigned to each of the computation resources of the vehicle computing system 110 based on the portion assignment data received from the operations computing system 190A. For example, a first portion of the model associated with input pre-processing operations can be assigned to a first computation resource and a second portion associated with other operations can be assigned to a second computation resource. The vehicle computing system 110 can process the motion planning data 175C with the distributed portions and computation resources to obtain the motion plan output. The motion plan can be provided to one or more additional systems of the vehicle 105 (e.g., vehicle interface 145, vehicle control system 150, etc.).

In some implementations, the vehicle computing system 110 can evaluate the processing performance of each of the computation resources and provide data descriptive of the processing performance to a computing system. As an example, the vehicle computing system 110 can provide the data descriptive of the processing performance to the operations computing system 190A via network(s) 120 using communication system 115. After providing the data, the vehicle computing system 110 can obtain an updated machine-learned graph model from the operations computing system 190A. The updated machine-learned graph model can be different than the optimized machine-learned graph model (e.g., updated portion assignment(s), compressed or altered portion(s), etc.). In such fashion, the operations computing system 190A can work in concert with the vehicle computing system 110 of the vehicle 105 to optimally distribute machine-learned models across the variety of computing devices and/or computation resources of the vehicle computing system 110.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 1, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel(s) can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155. The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor(s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 110 and/or provided to a remote computing system. For example, the map data 160 can provide the vehicle 105 relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception 170A, prediction 170B, and motion planning 170C. For example, the autonomy computing system 130 can obtain the sensor data 155 via the sensor(s) 135, process the sensor data 155 (and/or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computation resources. In some implementations, one or more of these functions can be performed via difference sub-systems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects that within the surrounding environment of the vehicle 105 based at least in part on the sensor data 135 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170C, using a perception system, etc.) can process the sensor data 155, the map data 160, etc. to obtain perception data 175A. The vehicle computing system 110 can generate perception data 175A that is indicative of one or more states (e.g., current and/or past state(s)) of one or more objects that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, one or more neural networks trained to identify object(s) within the surrounding environment of the vehicle 105 and the state data associated therewith. The perception data 175A can be utilized for the prediction function 175B of the autonomy computing system 140.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction system 175B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. This can include, for example, one or more neural networks trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory can be of a certain length and/or time range. A vehicle motion trajectory can be defined by one or more way points (with associated coordinates). The planned vehicle motion trajectories can indicate the path the vehicle 105 is to follow as it traverses a route from one location to another. Thus, the vehicle computing system 110 can take into account a route/route data when performing the motion planning function 170C.

The vehicle motion planning system can include an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning system 180 can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and a corresponding planned vehicle motion trajectory. For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

It should be noted that any and/or all of the processing tasks associated with perception task 170A, prediction task 170B, and motion planning task 170C can be performed using the machine-learned model(s) of the present disclosure (e.g., the machine-learned graph model, the machine-learned optimized graph model, etc.). More particularly, the portions of the graph model can be associated with processing tasks of any of the tasks 170A-170C of the autonomy computing system 140. As an example, each portion of the graph model can be associated with various processing operations of the perception task 170A. As another example, a first portion of the graph can be associated with perception task 170, a second portion can be associated with prediction task 170B, and third and fourth portions can be associated with motion planning task 170C. As such, the machine-learned model(s) of the present embodiments, and the portions of said models, can be utilized to process any or all tasks of the vehicle computing system 110 and/or the autonomy computing system 140.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, data descriptive of a processing performance of the computation resources of the vehicle computing system 110, and/or the state of an environment to a computing system that is remote from the vehicle 105, which can store such information in one or more memories remote from the vehicle 105. Moreover, the vehicle 105 can provide any of the data created and/or store onboard the vehicle 105 to another vehicle.

The vehicle computing system 110 can include the one or more vehicle user devices 180. For example, the vehicle computing system 110 can include one or more user devices with one or more display devices located onboard the vehicle 105. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of the vehicle 105 can provide user input to adjust a destination location of the vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, travelling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

As described previously, the operations computing system 190A of the service entity 185 can help to coordinate the performance of vehicle services by autonomous vehicles (e.g., by optimizing performance of distributed model processing by the vehicle computing system 110, etc.). The operations computing system 190A can include and/or implement one or more service platforms of the service entity. The operations computing system 190A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190 (e.g., its one or more processors, etc.) to perform operations and functions, such as those described herein matching users and vehicles/vehicle fleets, segregation of machine-learned model(s), assignment and optimization of portions of segregated machine-learned model(s), etc.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 194 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The service request 195 can indicate a type/size/class of vehicle such as, for example, a sedan, an SUV, luxury vehicle, standard vehicle, etc. The service request 195 can indicate a product of the service entity 185. For example, the service request 195 can indicate that the user is requesting a transportation pool product by which the user would potentially share the vehicle (and costs) with other users/items. In some implementations, the service request 195 can explicitly request for the vehicle service to be provided by an autonomous vehicle or a human-driven vehicle. In some implementations, the service request 195 can indicate a number of users that will be riding in the vehicle/utilizing the vehicle service. In some implementations, the service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 195. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determined which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

Figure 2:
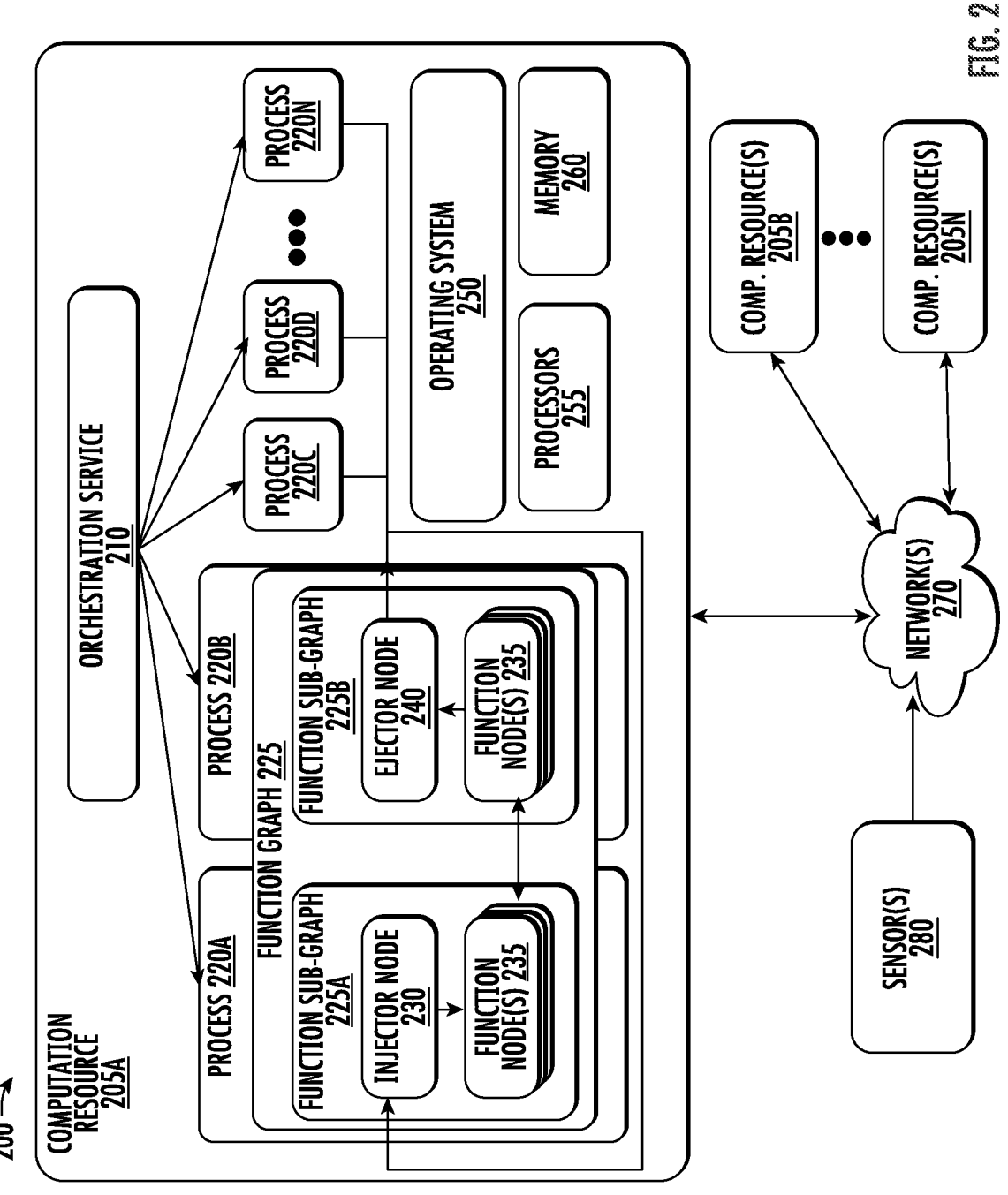
FIG. 2 depicts an example infrastructure system according to example embodiments of the present disclosure.

FIG. 2 depicts a diagram of an example computing system 200 including one or more of a plurality of computation resources (e.g., plurality of computation resources 205A-N) of the system of the present disclosure (e.g., vehicle computing system 110 of FIG. 1). The plurality of computation resources 205A-N can include one or more computation resources configured to communicate over one or more wired and/or wireless communication channels (e.g., wired and/or wireless networks). Each computation resource (e.g., 205A) can be associated with a type, an operating system 250, and/or one or more designated tasks. A type, for example, can include an indication of the one or more designated tasks of a respective computation resource 205A. The one or more designated tasks, for example, can include performing one or more processes 220A-N. As an example, each of the processes 220A-220N can correspond to a portion of a machine-learned model, and as such each computation resource 205A-N can perform operations of a process associated with a respective portion of the machine-learned model.

Each computation resource 205A of the plurality of computation resources 205A-N can include and/or have access to at least a portion of each of one or more processors 255 (e.g., graphics processing unit(s), FPGA(s), CPU(s), tensor processing unit(s), etc.) and/or one or more memories 260 (e.g., RAM memory, ROM memory, cache memory, flash memory, etc.). The one or more memories 260 can include one or more tangible non-transitory computer readable instructions that, when executed by the one or more processors 255, cause the computation resource 205A to perform one or more operations. The operations can include, for example, executing one or more of a plurality of processes of the computing system 200. For instance, each computation resource 205A can include a compute node configured to run one or more processes 220A-N of the plurality of processes.

For example, the computation resource 205A can include an orchestration service 210. The orchestration service 210 can include a start-up process of the computation resource 205A. The orchestration service 210 can, for example, include an operating system service (e.g., a service running as part of the operating system 250). In addition, or alternatively, the orchestration service can include a gRPC service. The computation resource 205A can run the orchestration service 210 to configure and start processes 220A-220N of the computation resource 205A. In some implementations, the orchestration service 210 can include a primary orchestrator and/or at least one of a plurality of secondary orchestrators. For example, each respective computation resource of the plurality of computation resources can include at least one of the plurality of secondary orchestrators. The primary orchestrator can be configured to receive global configuration data and provide the global configuration data to the plurality of secondary orchestrators. The global configuration data, for example, can include one or more instructions indicative of the one or more designated tasks for each respective computation resource(s) 205A-N, a software version and/or environment on which to run a plurality of processes (e.g., 220A-220N of the computation resource 205A) of the computing system 200, etc. A secondary orchestrator for each respective computation resource can receive the global configuration data and configure and start one or more processes at the respective computation resource based on the global configuration data.

Additionally, the orchestration service 210 can perform segregation of a machine-learned model into portions, and can perform assignment of each of these portions to a computation resource 205A-N (e.g., generate portion assignment data descriptive of the assignments, etc.). As an example, the orchestration service can analyze a machine-learned model (e.g., a graph neural network, etc.) and determine a plurality of portions from the machine-learned model (e.g., based on a minimum processing capability, etc.). Each of the portions can be associated with a process (e.g., processes 220A-220N) that include the operations to process the portion of the machine-learned model. The orchestration service can subsequently assign each of the portions of the machine-learned model to a respective computation resource 205A-N. In such fashion, each of the computation resources 205A-N can be assigned a portion of the machine-learned model for processing (e.g., the process associated with the portion, etc.).

It should be noted that each portion of a machine-learned model does not need to be associated with a respective process (e.g., process 220A-N). More particularly, a process (e.g., process 220A-N) can perform operations associated with each portion of a machine-learned model. As an example, a model can be segregated into portions that are processed as a function graph 225, which can be processed by one process or across a plurality of processes (e.g., process 220A-N).

Each process (e.g., process 220A, 220B) can include a plurality of function nodes 235 (e.g., a machine-learned portion, components of a machine-learned portion, etc.) connected by one or more directed edges that dictate the flow of data between the plurality of function nodes 235. Each computation resource 205A can execute (e.g., via one or more processors, etc.) a respective plurality of function nodes 235 to run a respective process 220A, 220B. For example, the plurality of function nodes 235 can be arranged in one or more function graphs 225. A function graph 225 can include a series of function nodes 235 arranged (e.g., by one or more directed edges) in a pipeline, graph architecture, etc.

Figure 3:
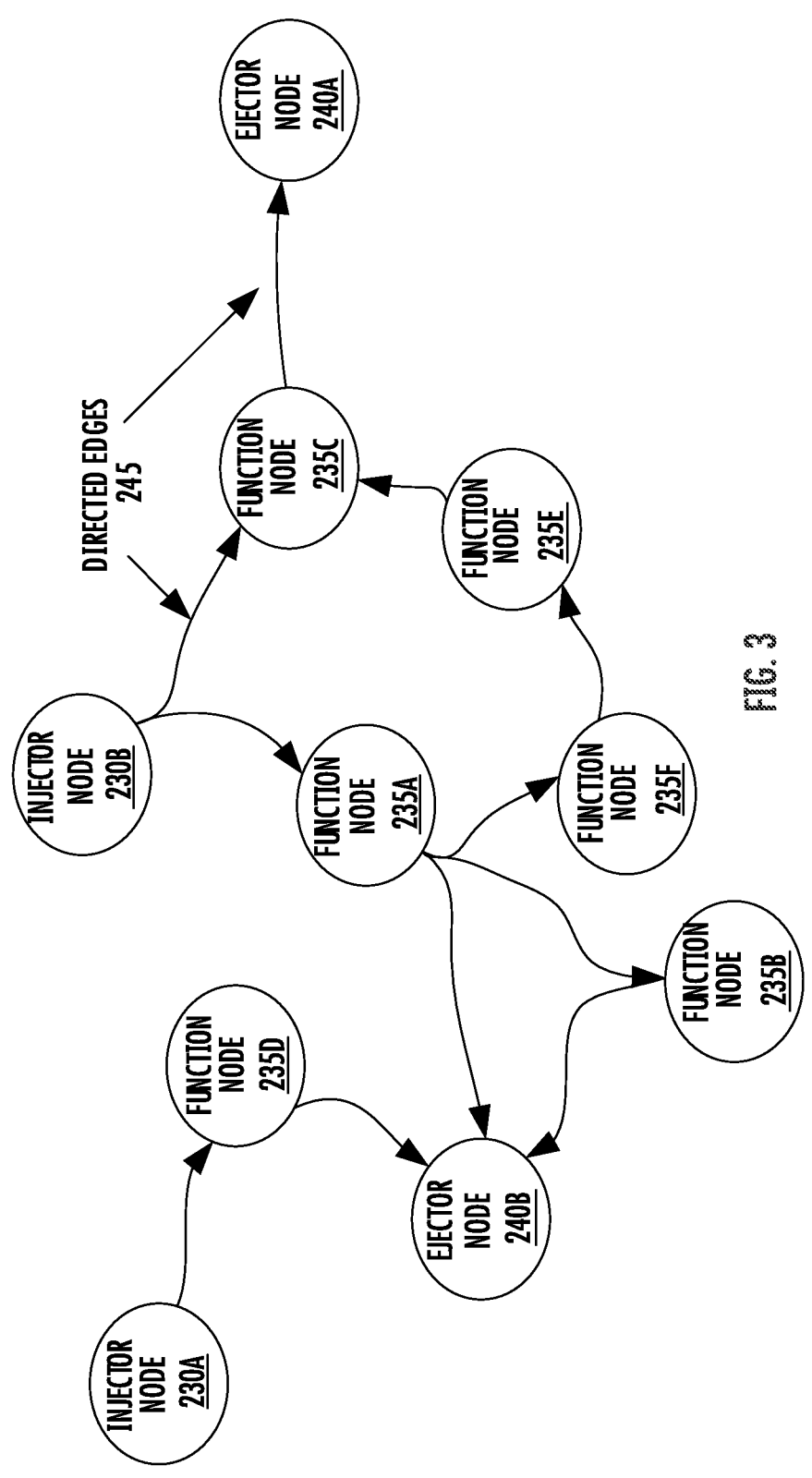
FIG. 3 depicts an example graph processing structure according to example embodiments of the present disclosure.

For example, with reference to FIG. 3, FIG. 3 depicts a diagram of an example functional graph 225 according to example implementations of the present disclosure. The function graph 225 can include a plurality of function nodes 235A-F, one or more injector nodes 230A-B, one or more ejector nodes 240A-B, and/or one or more directed edges 245.

Each of the function nodes 235A-F can be associated with one or more portions of a segregated machine-learned model. For example, a function node 235A can be associated with one or more first layers of a first portion of a machine-learned graph model, function node 235B can be associated with one or more second layers of a second portion of the machine-learned graph model, injector node 230A can be associated with one or more input layers of the machine-learned graph model, and ejector node 240A can be associated with one or more output layers of a machine-learned graph model (e.g., an argmax layer, a softmax layer, other custom mathematical operations, etc.). As another example, each of the function nodes 235A-F, injector nodes (e.g., input nodes) 230A-B, and ejector nodes (e.g., output nodes) 240A-B can be associated with one portion of a machine-learned graph model. As such, each of the nodes of FIG. 3 can correspond to any operations associated with one or more portions of a segregated machine-learned model.

Additionally, or alternatively, each of the function nodes 235A-F can include computing function(s) associated with one or more inputs (e.g., of one or more data types) and one or more outputs (e.g., of one or more data types). For example, the function nodes 235A-F can be implemented such that they define one or more accepted inputs and one or more outputs. In some implementations, each function node 235A-F can be configured to obtain one or more inputs of a single data type, perform one or more functions on the one or more inputs, and output one or more outputs of a single data type.

The function nodes 235A-F can be connected by one or more directed edges 245 of the function graph 225 (and/or a subgraph 225A, 225B of the function graph 225 with reference to FIG. 2). The one or more directed edges 245 can dictate how data flows through the function graph 225 (and/or the subgraphs 225A, 225B of FIG. 2). For example, the one or more directed edges 245 can be formed based on the defined inputs and outputs of each of the function nodes 235A-F of the function graph 225. Each function graph 225 can include one or more injector nodes 230A-B and one or more ejector nodes 240A-B configured to communicate with one or more remote computation resources and/or processes (e.g., processes 220C-220N of FIG. 2) outside the function graph 225. The injector nodes 230A-B, for example, can be configured to communicate with one or more computation resources and/or processes (e.g., processes 220C-220N of FIG. 2) outside the function graph 225 to obtain input data for the function graph 225. By way of example each of the one or more injector nodes 230A-B can include a function configured to obtain and/or process sensor data from a respective sensor 280 shown in FIG. 2 (e.g., sensor(s) 135 of FIG. 1). The ejector nodes 240A-B can be configured to communicate with one or more computation resources 205B-N and/or processes 220C-220N outside the function graph 225 to provide output data of the function graph 225 to the one or more computation resources 205B-N and/or processes 220C-220N.

Turning back to FIG. 2, each computation resource 205A-N can be configured to execute one or more function graphs 225 to run one or more processes 220A, 220B of the plurality of processes 220A-N of the respective computation resource 205A. For example, as described herein, each respective computation resource can be configured to run a respective set of processes based on global configuration data (e.g., portion assignment data, etc.). Each process 220A-N can include an executed instance of a function graph and/or a subgraph of a function graph. For example, in some implementations, a function graph 225 can be separated across multiple processes 220A, 220B. Each process 220A, 220B can include a subgraph 225A, 225B (e.g., process 220A including subgraph 225A, process 220B including subgraph 225B, etc.) of the function graph 225. In such a case, each process 220A, 220B of the function graph 225 can be communicatively connected by one or more function nodes 235 of the function graph 225. In this manner, each respective computation resource 205A-N can be configured to run a respective process by executing a respective function graph and/or a subgraph of the respective function graph. Thus, each function graph can be implemented as a single process or multiple processes, and accordingly, each portion of a machine-learned model can be assigned to a respective computation resource of the plurality of computation resources 205A-N.

The plurality of computation resources 205A-N, sensors 280, processes 220A-N (e.g., of each respective computation resource 205A), etc. can be communicatively connected over one or more wireless and/or wired networks 270. For instance, the plurality of computation resources 205A-N (and/or processes 220A-N of computation resource 205A) can communicate over one or more communication channels 270. For example, process(es) at each computation resource can exchange messages over the one or more communicative channels 270 using a message interchange format (e.g., JSON, IDL, etc.). By way of example, each respective process can utilize one or more communication protocols (e.g., HTTP, REST, gRPC, etc.) to provide and/or receive messages from one or more respective computation resource processes (e.g., other processes running on the same computation resource) and/or remote processes (e.g., processes running on one or more other computation resources of the computing system).

Alternatively, or additionally, each of the computation resources 205A-N, sensors 280, processes 220A-N, etc. can be components of a singular computing system (e.g., vehicle computing system 110 of FIG. 1). As an example, the computation resources 205A-N can be groupings of computing device(s) included in the vehicle computing system of FIG. 1.

For example, the vehicle computing system 110 can include a plurality of processors 255, each with varying processing capabilities (e.g., FPGAs, ASICs, CPUs, etc.). Computation resource 205A can be or otherwise include a GPU and computation resource 205B can be or otherwise include an FPGA. Each of computation resources 205A and 205B can be assigned one or more processes associated with a first and second portion of a machine-learned model. The computation resources 205A can receive an input (e.g., at an injector node 230A of an associated function sub-graph 225A), and can process the input with the one or more processes associated with the first portion to generate an output (e.g., at an ejector node 240A of the associated function graph 225). The output can be communicated to the second computation resource 205B via a communication system (e.g., a serial bus, a printed circuit board, a bridge, a network port, communication system 115 of FIG. 1, etc.). The output can be received at the second resource 205B (e.g., at an injector node 230B of an associated function sub-graph 225B) and can be processed with the one or more processes associated with the second portion of the model to generate a second output. In such fashion, the machine-learned model can be segregated according to embodiments of the present disclosure, and can be assigned via an orchestration service (e.g., orchestration service 210) to various computation resources (e.g., resources 205A-N) for processing.

Figure 4:
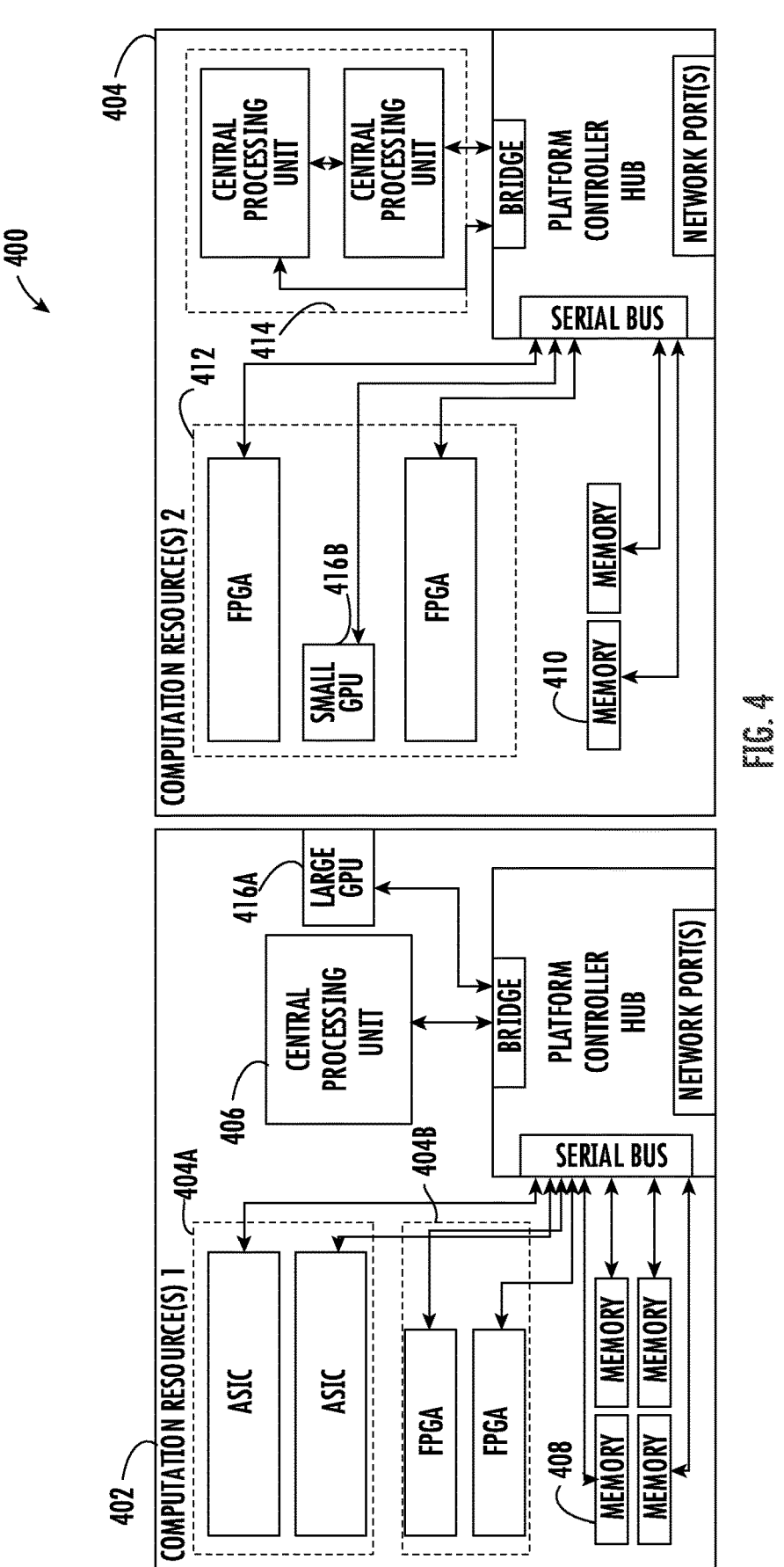
FIG. 4 depicts an example computing system including a plurality of computation resources according to example embodiments of the present disclosure.

FIG. 4 depicts an example computing system 400 including a plurality of computation resources 402 and 404 according to example embodiments of the present disclosure. Each of the computation resource(s) 402 and 404 can be or otherwise be included in the computing systems described in the present disclosure (e.g., vehicle computing system 110 of FIG. 1, etc.). It should be noted that the devices included in computation resources 402/404 (e.g., ASICs 404A, GPUs 416A/B, FPGAs 412, etc.) are depicted as being included in computation resource(s) merely to illustrate example embodiment(s). Rather, each of the depicted devices can be a computation resource or can otherwise be included in computation resource(s). As an example, both or either of the ASICs 404A could be a computation resource. As another example, the large GPU 416A and the small GPU 416B can be a computation resource together, or can be individual portions included in multiple computation resources. As such, any device of a computing system (e.g., vehicle computing system 110, operations computing system 190A, etc.) can be considered a computation resource, or can be included in one or more computation resources.

More particularly, computation resource(s) 402 can be or otherwise include a computation resource including a plurality of computation devices (e.g., ASICs 404A, FPGAs 404B, memories 408, CPU 406, etc.). Additionally, or alternatively, each of the computing devices included in computation resource(s) 402 can be or otherwise be included in a computation resource. More particularly, computing devices (e.g., FPGAs, CPUs, CPU cores, GPUs, etc.) can be dynamically partitioned as computation resource(s). As an example, the computation resource(s) 402 could be or otherwise include both of the ASICs 404A. The computation resource(s) 402 could then be dynamically partitioned to further include one or more cores of the central processing unit 406. Other resources (e.g., FPGAs 404B and memories 408, etc.) could be included in a different computation resource. Dynamic partitioning of various computing devices or portions of computing devices into a computation resource can be based on a variety of factors, including but not limited to available hardware resources, hardware failure (s), anticipated (e.g., predicted) processing operation(s), received data types and/or quantities, etc.

Similarly, computation resource(s) 404 can include a plurality of computing devices that can each be or otherwise be included in the computation resource(s) 404 and/or a different computation resource. As an example, the computation resource 404 can include both FPGAs 412 and one of the two CPUs 414. Further, the computation resource 404 can include a small GPU 416B, while the computation resource 402 includes a large GPU 416A. In such fashion, a computation resource can include different sizes of computational devices. Following the previous example, a different computation resource could include the second CPU 414 and the memories 410.

FIG. 5 depicts a data flow diagram 500 for determining and assigning portions of a graph model to computation resources of a computing system according to example embodiments of the present disclosure. More particularly, a graph model 501 can include a plurality of various interconnected processing operations. As depicted, the model 501 can include sensor data 1 input 502 (e.g., LIDAR data, image data, ultrasonic data, heat data, radar data, etc.), sensor data 2 input 504 (e.g., LIDAR data, image data, ultrasonic data, heat data, radar data, etc.), sensor data 1 preprocessing 506, math operations 507, LIDAR pre-processing 508, fused trunk 510, and post-processing 512. Each of these processing operations 502-512 can be performed by and/or associated with one or more layers and/or components (e.g., one or more neural network neurons, submodel(s), portion(s), etc.) of the graph model 501. As an example, the sensor data 1 input 502 and sensor data 2 input 504 operations could be associated with one or more input layers of the graph model. As another example, the post-processing operations 512 could be associated with one or more output layers of the graph model (e.g., softmax layer(s), argmax layer(s), etc.). Further, each of these processing operations can be associated with one or more nodes (e.g., compute node(s)) of the graph model.

The graph model 501 can be processed by a computing system that includes a plurality of computation resources 526-530 (e.g., GPUs, ASICs, FPGAs, CPUs, etc.). As described previously, the processing of a non-segregated, conventional machine-learned model is generally performed by a single computational resource (e.g., a GPU, etc.), leaving other computation resources idle. To help better allocate the model (e.g., graph model 501) to the various computation resources, a computing system can perform portion determination 514 to separate the graph model 501 into a plurality of portions 516, 518, 520, and 522. As described previously, the graph model 501 can be or otherwise include a plurality of connected nodes that correspond to the processing operations depicted for graph model 501 (e.g., 502-512). Subsets of these nodes can be cut away from the graph model 501 to form portions of the model 516-522.

More particularly, node(s) associated with sensor data 1 input 502, sensor data 1 preprocessing 506, and math ops 507 can be segregated from the graph model 501 and included in a first portion 516. Node(s) associated with sensor data 2 input 504 and sensor data 2 pre-processing 508 can be segregated from the graph model 501 and included in a second portion 518. Node(s) associated with fused trunk 510 can be segregated from the graph model 501 and included in a third portion 520. Node(s) associated with post-processing/output 512 can be segregated from the graph model 501 and included in a fourth portion 522.

The segregation of these portions 516-522 of the graph model 501 can be associated with a minimum processing capability. The minimum processing capability can be a level of processing capability for a computation resource (e.g., 526-532) required to process the operations included in the portion, and the minimum processing capability can be determined based on the requirements of the operations. The minimum processing capability can be described using different metrics than the processing capability of the computation resources. The computing system can be configured to translate the metric(s) associated with at least one of the minimum processing capability and/or the processing capability of the computation resources in order to help compare/ match these elements.

As an example, portion 516 can be determined to have a minimum processing capability of FP32 due to one or more of the operations of portion 516 (e.g., sensor data 1 input 502, sensor data 1 preprocessing 506, math ops 507, etc.) requiring an accuracy of FP64. As another example, portion 2 518 can be determined to have a minimum processing capability of FP16 due both sensor data 2 input 504 and sensor data 2 pre-processing 508 operations requiring a minimum of at most FP16. In such fashion, portion 520 can be determined to have a minimum processing capability of FP32 and portion 522 can be determined to have a minimum processing capability of FP16.

It should be noted that, in some implementations, the segmentation of the graph model 501 to form the portions 516-522 can be based on the minimum accuracy and/or speed required to perform the operations of the portions. As an example, if each of the operations in portion 516 (e.g., sensor data 1 input 502, sensor data 1 preprocessing 506, math ops 507, etc.) requires a floating point precision of FP64, the subset of nodes associated with operations 502, 506, and 507 can be "cut" to be included in the portion 516 so that the entire subset of nodes can be processed by a computation resource capable of processing at a precision of FP32 (e.g., computation resource 526, computation resource 530, etc.).

The computation resources (e.g., 526, 528, 530, 532) of the computing system can include and/or be associated with a processing capability. This processing capability can be determined based on the device(s) or portion(s) of device(s) included in each computational resource (e.g., 526, 528, 530, 532). More particularly, each of the computation resources (e.g., 526, 528, 530, 532) can include at least a portion of any physical or virtual computation devices (e.g., processors, processor cores, memory devices, application-specific integrated circuits, graphics processing units, tensor processing unit(s), field-programmable gate arrays, accelerators, etc.). Each of the computation resources (e.g., 526, 528, 530, 532) can include and/or be associated with a processing capability (e.g., a floating point precision, a processing throughput, a processing latency, etc.). As an example, a vehicle computing system can include a processor with a plurality of processing cores (e.g., sixteen processing cores, etc.), a large graphics processing unit (GPU), a small GPU, and a field-programmable gate array (FPGA). A first computational resource 526 may include the large GPU, and the large GPU can be capable of performing processing operations at a very high accuracy (e.g., a floating point precision of 32 bits (FP32), a relatively large FP32 processing throughput, etc.), therefore providing the first computation resource 526 a high level of processing capability. A second computational resource 528 may include an FPGA, and the FPGA can be capable of performing processing operations at an accuracy and/or speed less than the GPU of computation resource 526 (e.g., a floating point precision of 16 bits (FP16), a relatively small FP16 processing throughput, etc.), therefore providing the second computation resource 528 with a processing capability less than the first computation resource 526. As such, the physical and/or virtual processing devices of computation resources can vary, and the processing capabilities of the computation resources can vary accordingly (e.g., 526, 528, 530, 532).

Based on the minimum processing capabilities of the portions (e.g., 516, 518, 520, 522), and the processing capabilities of the computation resources (e.g., 526, 528, 530, 532), each of the plurality of portions 516-522 can be assigned to a respective computation resource of the plurality of computation resources 526-530 via resource assignment 524. As an example, first portion 516 has a minimum processing capability of FP32, and portion 2 518 has as minimum processing capability of FP16. First portion 516 can be assigned to computing resource 526, which has a processing capability of FP32 and therefore meets the minimum requirement of first portion 516. Similarly, second portion 518 can be assigned to computing resource 528, which has a processing capability of FP16 and therefore meets the minimum requirement of second portion 518. Accordingly, third portion 520 can be assigned to computing resource 530 and fourth portion 522, which has minimum processing capability of INT8, can be assigned to computing resource 532, which has a processing capability of INT8. In such fashion, during resource assignment 524 each of the portions 516-522 can respectively be assigned to a computation resource 526-532 that fulfills the minimum processing requirement of the portion.

It should be noted that although floating point precision (e.g., FP32, FP16, INT8, etc.) is depicted as a representation of processing capability, precision is merely one metric among a multitude of metrics to evaluate processing capability. Other metrics, such as bandwidth, throughput, processing latency, access to certain specialized resources (e.g., tensor cores, etc.), and any other performance-based processing metric can be utilized to establish a processing capability and a minimum processing capability. As such, processing capability can be a measure of any performance metric that is relevant to the workload being processed (e.g., speed, bandwidth, accuracy, etc.).

After assigning the portions 516-522 to the respective computation resources 526-532, the assignments can be saved as portion assignment data 534. The portion assignment data 534 can describe each of the assignments of the plurality of portions (e.g., 516, 518, 520, 522) to a respective computation resource (e.g., 526, 528, 530, 532, etc.). It should be noted that portion determination 514 and resource assignment 524 can be performed by a computing device and/or system that is distinct from the computing system that includes the plurality of computation resources 526-532.

Using the computing systems of FIG. 1 as an example, the computation resources 526-532 can be included in the vehicle computing system 110 of FIG. 1. The operations computing system 190A of FIG. 1 can perform portion determination 514 and resource assignment 524 to determine the plurality of portions 516-522 and generate the portion assignment data 534. The portion assignment data and the portions 516-522 can be provided by the operations computing system 190A to the vehicle computing system 110 (e.g., via network(s) 120 using communication system 115). The vehicle computing system can process each of the provided graph model portions 516-522 using the respectively assigned portion (e.g., 526, 528, 530, 532, etc.) that is described by the portion assignment data 534.

In such fashion, an operations computing system (e.g., system 190A, etc.) associated with a service entity (e.g., entity 185) can obtain a machine-learned model (e.g., graph model 501), segregate the model into a plurality of portions (e.g., 516-522), determine a minimum processing capability for the portions and a processing capability for the computation resources (e.g., 526-532) of a vehicle computing system (e.g., system 110). The operations computing system can provide the assignments (e.g., portion assignment data 534) to the vehicle computing system alongside the portions, therefore optimizing the vehicle computing system by reducing the number of idle computational resources of the vehicle computing system.

Figure 6A:
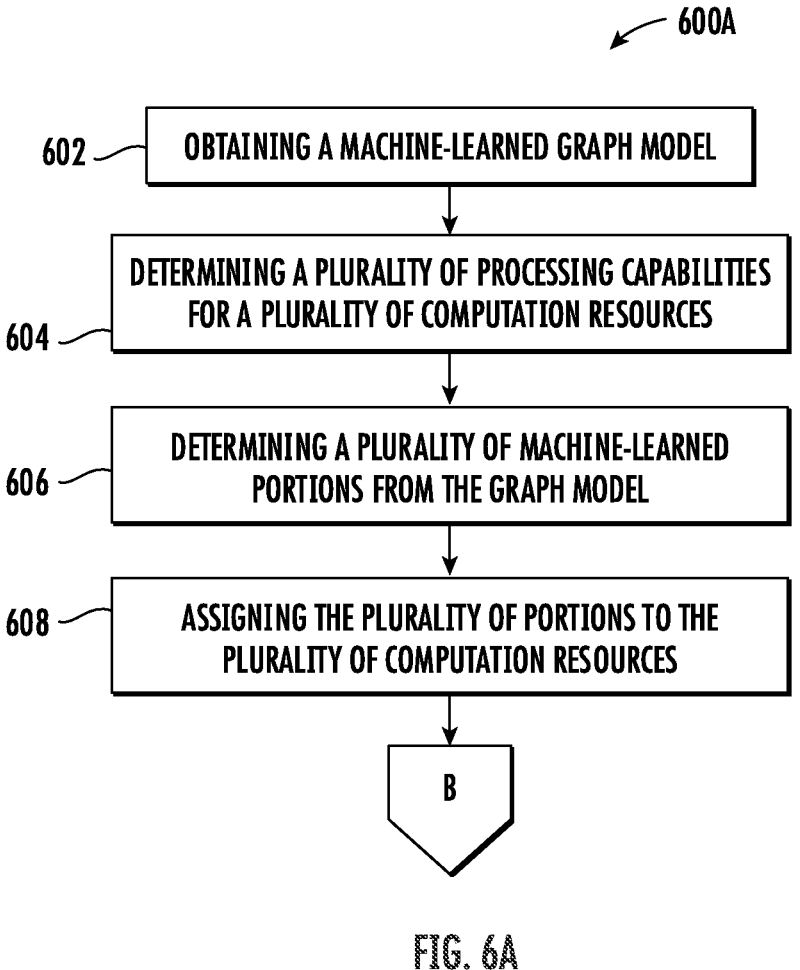
FIG. 6A depicts a flowchart of a method for determining and assigning portions of a machine-learned model to computation resources of a computing system according to example embodiments of the present disclosure.

FIG. 6A depicts a flow diagram of an example method 600A for determining and assigning portions of a machine-learned model to computation resources of a computing system according to example embodiments of the present disclosure. One or more portion(s) of the method 600A can be implemented by one or more computing devices such as, for example, the computing devices described in FIGS. 1, 2, 4, and 5. Moreover, one or more portion(s) of the method 600A can be implemented as an algorithm on the hardware components of the device(s) described herein (e.g., as in FIGS. 1, 2, 4, 7, and 8) to, for example, segregate and assign portions of a machine-learned model. FIG. 6A depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (602), the method 600A can include obtaining a machine-learned graph model. For instance, a computing system (e.g., operations computing system 190A) can obtain a graph model (e.g., a machine-learned graph neural network, etc.). The operations computing system can be a computing system associated with a service entity (e.g., service entity 185 of FIG. 1, etc.). The graph model can be, for example, a machine-learned graph model. A machine-learned graph model can be a machine-learned graph neural network that can be utilized to perform at least a portion of the computations required to facilitate operation of an autonomous vehicle (e.g., perception operation(s), prediction operation(s), motion planning operation(s), etc.). The graph model can be one that is ultimately implemented on an autonomous vehicle for performing the autonomy functions of the autonomous vehicle. It should be noted that each of the connected nodes of the graph model can include one or more neural unit(s) (e.g., neuron(s), layer(s), portion(s), etc.) of a neural network, and/or can include one or more neural network(s). Additionally, in some implementations, the portion(s) can include deterministic operation(s) and/or algorithm(s) that are not necessarily machine-learned (e.g., pre-processing operation(s), mathematical operation(s), post-processing algorithm(s), etc.).

It should be noted that although the present disclosure is described primarily in the context of facilitating autonomous vehicle operations for an autonomous vehicle computing system, aspects of the present disclosure are not limited to this context. Rather, systems and methods of the present disclosure can provide segregation of a machine-learned graph model that is trained for any purpose. As an example, systems and methods of the present disclosure can be used to segregate a machine-learned graph model for backend operations across a system of distributed processing devices (e.g., cloud-based image processing, route planning, service optimization, vehicle distribution, statistical analysis, etc.). As another example, systems and methods of the present disclosure can be used to segregate a graph that includes a plurality of machine-learned models across a plurality of computing systems (e.g., assignment of a plurality of machine-learned models that are components of a directed graph based processing architecture). In such fashion, systems and methods of the present disclosure can be applied in a broad variety of machine-learning applications to more facilitate segregation, assignment, and optimization of machine-learned models to various computation resources for distributed processing.

At (604), the method 600A can include determining a plurality of processing capabilities for a plurality of computation resources. For instance, a computing system (e.g., operations computing system 190A), to help facilitate model-hardware segregation, can identify the available hardware resources of a computing system (e.g., the same operations computing system 190A, the vehicle computing system 110, etc.). For instance, the computing system can determine a plurality of processing capabilities for a respective plurality of computation resources. A computation resource can include at least a portion of any physical or virtual computation devices (e.g., processors, processor cores, memory devices, application-specific integrated circuits, graphics processing units, tensor processing unit(s), field-programmable gate arrays, accelerators, etc.). Each of the computation resources can include and/or be associated with a processing capability (e.g., a floating point precision, a processing throughput, a processing latency, etc.). As an example, a vehicle computing system can include a processor with a plurality of processing cores (e.g., sixteen processing cores, etc.), a large graphics processing unit (GPU), a small GPU, and a field-programmable gate array (FPGA). A first computational resource may include the large GPU, and the large GPU can be capable of performing processing operations at a very high accuracy (e.g., a floating point precision of 64 bits (FP64), a relatively large FP64 processing throughput, etc.), therefore providing a high level of processing capability. A second computational resource may include the FPGA, and the FPGA can be capable of performing processing operations at an accuracy and/or speed less than the GPU (e.g., a floating point precision of 32 bits (FP32), a relatively small FP32 processing throughput, etc.), therefore providing the second computation resource with a processing capability less than the first computation resource. As such, the physical and/or virtual processing devices of computation resources can vary, and the processing capabilities of the computation resources can vary accordingly.

In some implementations, a computation resource can include a portion of a physical or virtual processing device. As an example, a first computation resource can be or otherwise include the tensor cores of a graphics processing unit, and a second computation resource can be or otherwise include the compute unified device architecture (CUDA) cores of a graphics processing unit. As another example, a first computation resource can be or otherwise include virtualized processor core(s) executed by a core of a physical CPU while a second computation resource can be or otherwise include additional virtualized processor cores(s) provided by the processor core and/or additional processor core(s) of the CPU. As such, a computation resource can include any portion and/or number of physical and/or virtualized processing device(s).

At (606), the method 600A can include determining a plurality of machine-learned portions from the graph model. For instance, to help better allocate the graph model to the various computation resources a computing system (e.g., operations computing system 190A) can separate the graph model into a plurality of portions. For instance, a plurality of portions can be determined from the machine-learned graph model. More particularly, the machine-learned graph model can be segregated (e.g., "cut") at certain points to determine a plurality of portions of the machine-learned graph model. As an example, the machine-learned graph model can be or otherwise include a machine-learned graph neural network that includes a plurality of connected nodes. Subsets of the nodes can be cut away from the graph neural network to form portions of the network. For example, the machine-learned graph neural network can include 5 nodes, and a first portion can include the first two nodes and a portion can include the last three nodes. It should be noted that the segregation of node subsets from the machine-learned graph model can be performed using any conventional machine-learning tools and/or libraries (e.g., PyTorch, etc.).

Each of the portions of the machine-learned graph model can be associated with a minimum processing capability. The minimum processing capability can be a level of processing capability for a computation resource required to process the portion. In some implementations, the minimum processing capability can be described using the same metrics as the processing capability of the computation resources (e.g., a floating point precision, a processing throughput, a processing latency, etc.). In some implementations, the minimum processing capability can be described using different metrics than the processing capability of the computation resources. The computing system can be configured to translate the metric(s) associated with at least one of the minimum processing capability and/or the processing capability of the computation resources in order to help compare/match these elements.

In some implementations, the plurality of nodes of the machine-learned graph model can each be connected to at least one other node of the plurality of nodes. Further, in some implementations, each of the plurality of nodes can include one or more neural units of a neural network. As an example, a node of the machine-learned graph model may include one or more neurons (e.g., a single neuron, a layer of neurons from the graph model, a plurality of layers of neurons, etc.). As another example, a node of the machine-learned graph model may include one or more machine-learned functions (e.g., an activation layer, etc.). As yet another example, a node of the machine-learned graph model may be configured to perform one or more algorithms on received data (e.g., image preprocessing, etc.).

In some implementations, the subset of nodes of a portion of the machine-learned graph model may include nodes of differing minimum processing capabilities. As an example, a first node of the subset of nodes may have a minimum processing capability including a floating point precision of 32 bits. A second node of the subset of nodes may have a minimum processing capability including a floating point precision of 64 bits. In some implementations, the minimum processing capability of the portion itself can be that of the highest individual node of its subset of nodes. To follow the previous example, the portion including the first node and the second node could have a minimum processing capability including a floating point precision of 64 bits. Alternatively, in some implementations, each node of a subset of nodes of a portion of the machine-learned graph model can have identical minimum processing capabilities.

In some implementations, the segmentation of the model to form the portions (e.g., the subsets of nodes) can be based on the minimum accuracy and/or speed required to perform the operations of the subsets of nodes. As an example, if each of the operations in a subset of nodes requires a floating point precision of FP64, the subset of nodes can be "cut" to be included in a portion so that the entire subset of nodes can be processed by a computation resource capable of processing at a precision of FP64. As another example, a first subset of nodes can have an associated processing latency. A second subset of nodes can be "cut" to be included in a second portion such that a third portion of nodes can receive the outputs of the first and second portions at an optimal time. More particularly, the subset of nodes can be included in the portion to minimize and/or optimize the latency of the distributed processing of the machine-learned graph model.

At (608), the method 600A can include assigning the plurality of portions to the plurality of computation resources. For instance, a computing system (e.g., operations computing system 190A) can assign, based on the minimum processing capabilities of the portions and the processing capabilities of the computation resources, each of the plurality of portions to a respective computation resource of the plurality of computation resources. As an example, a first portion can have a minimum processing capacity that includes a minimum floating point precision of 32 bits, while a second portion can have a minimum floating point precision of 16 bits. A first computation resource can have a processing capability that includes a maximum floating point precision of 16 bits. A second computation resource can have a processing capability that includes a maximum floating point precision of 32 bits. The first portion can be assigned to the second computation resource and the second portion can be assigned to the first computation resource. In such fashion, each of the computation resources can be utilized to an optimal degree to process portions of the machine-learned graph model.

FIG. 6B depicts a flowchart of a method 600B for optimizing one or more portions of a segregated model to obtain an optimized machine-learned model according to example embodiments of the present disclosure. It should be noted that one or more portion(s) of the method 600B can be performed subsequently to and/or concurrently with one or more portions of the method 600A of FIG. 6A. As an example, portion 610 of the method 600B can directly follow the operations of portion 608 of the method 600A of FIG. 6A. Additionally, one or more portion(s) of the method 600B can be implemented by one or more computing devices such as, for example, the computing devices described in FIGS. 1, 2, 4, and 5. Moreover, one or more portion(s) of the method 600B can be implemented as an algorithm on the hardware components of the device(s) described herein (e.g., as in FIGS. 1, 2, 4, 7, and 8) to, for example, segregate and assign portions of a machine-learned model. FIG. 6B depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (610), the method 600 can include providing each of the portions to an assigned computation resource. For instance, a computing system (e.g., operations computing system 190A) can provide each of the plurality of machine-learned portions to a respective computation resource to which the machine-learned portion is assigned. Each of the computation resources can be configured to process an assigned portion of the machine-learned graph model. In such fashion, the segregated machine-learned graph model (e.g., the plurality of portions) can be provided to the plurality of hardware resources for optimal distributed processing.

In some implementations, one or more connections can be first be generated between each of the portions to obtain a reconstructed machine-learned graph model. More particularly, the connections between nodes of the machine-learned graph model (e.g., the connections between the subsets of the nodes) can be restored to reconstruct the machine-learned graph model for processing. After obtaining the reconstructed machine-learned graph model, the model can be provided to the plurality of computation resources. The plurality of computation resources can be configured to process the reconstructed machine-learned graph model (e.g., according to the assignment of the portions to the each of the computation resources, etc.).

At (612), the method 600 can include obtaining data descriptive of a processing performance of each of the computation resources. For instance, a computing system (e.g., operations computing system 190A) can obtain data descriptive of the processing performance of each of the computation resources of a vehicle computing system (e.g., vehicle computing system 110) that processed the provided portions of the graph model. The processing performance can describe one or more processing metrics (e.g., a processing latency, a processing bandwidth, an accuracy of output data associated with the processing, etc.). As an example, the data descriptive of the processing performance may indicate that the output data from processing a portion by a computation resource was not accurate enough to facilitate proper operations (e.g., of an autonomous vehicle task, etc.). As another example, the data descriptive of the processing performance may indicate that the output data from processing of a portion by a computation resource can be less accurate and still facilitate proper operations. As such, the data descriptive of the processing performances can be utilized to further optimize the structure of the portions and/or the assignment of portions to computation resources.

At (614), the method 600 can include applying, based on the processing performances, optimization(s) to obtain an optimized machine-learned graph model. For instance, a computing system (e.g., operations computing system 190A) can apply one or more optimizations to one or more respective portions of the graph model to obtain an optimized machine-learned graph model. The one or more optimizations can be based at least in part on the processing performance of the one or more computation resources assigned to process the one or more portions of the machine-learned graph model. The optimization(s) can include adjusting the minimum processing capability of the portion(s) and/or compressing a subset of nodes of the portion(s). As an example, a processing performance of a first computation resource assigned to a first portion may indicate that an output of the computation resource can be less accurate and can still facilitate proper operations. In response, the first portion can be optimized. For example, the subset of nodes of the first portion can be compressed (e.g., compressing layer(s) of a neural network, combining the operations of two nodes into one node, etc.). For another example, the minimum processing capability of the first portion can be reduced (e.g., reduced from a 64-bit floating point minimum precision to a 32-bit floating point minimum precision, etc.).

In some implementations, the one or more optimizations can be further based at least in part on an autonomous vehicle processing task respectively associated with the machine-learned portion. More particularly, the optimizations can be based on the proposed autonomous vehicle task output assigned to the portion of the machine-learned graph model. As an example, a portion may be associated with a data processing task and/or data preprocessing task (e.g., LIDAR data preprocessing and/or processing, image data preprocessing and/or processing, etc.). As another example, a portion may be associated with a certain ask (e.g., image segmentation, LIDAR segmentation, fused segmentation, detection, estimation, etc.). As yet another example, a portion may be associated with one or more mathematical operations. It should be noted that, in various implementations, the optimization(s) can occur either before or after the graph model is reconnected.

At (616), the method 600 can include providing the optimized machine-learned graph model to the respective plurality of computation resources for processing. For instance, a computing system (e.g., operations computing system 190A) can provide the optimized machine-learned graph model to a computing resources of a vehicle computing system (e.g., system 110) for processing. The computing resources of the vehicle computing system can process the plurality of portions to obtain an output different than the previous output generated before application of optimizations to the graph model.

At (618), the method 600 can include obtaining data indicative of an updated processing performance of at least one of the plurality of computation resources. The updated processing performance of the at least one computation resource can be different than the processing performance of the at least one computation resource. For instance, a computing system (e.g., operations computing system 190A) can obtain data indicative of an updated processing performance for a computation resource. As an example, a first computation resource can process a first portion of the machine-learned graph model. Processing performance data can be obtained that describes the relative performance of the first computation resource. Optimization(s) can be applied to the first portion (e.g., compression of nodes included in the first portion, etc.) to generate an optimized first portion of an overall optimized machine-learned graph model. The first computation resource can obtain the optimized first portion and process the optimized first portion. Data associated with the processing of the optimized first portion can be obtained by the computing system that indicates that the processing performance of the first portion was greater after adjustments were applied to the first portion, therefore indicating that the machine-learned graph model has been optimized by the applied adjustments. In such fashion, the operations computing system (e.g., system 190A) can iteratively apply adjustments to portions of the machine-learned graph model to fully optimized distributed processing of the segregated graph model.

FIG. 7 depicts a flowchart of a method 700 for distributed processing of a segregated and optimized machine-learned graph model according to example embodiments of the present disclosure. One or more portion(s) of the method 700 can be implemented by one or more computing devices such as, for example, the computing devices described in FIGS. 1, 2, 4, and 5. Moreover, one or more portion(s) of the method 700 can be implemented as an algorithm on the hardware components of the device(s) described herein (e.g., as in FIGS. 1, 2, 4, 7, and 8) to, for example, perform distributed processing of an optimized segregated graph model. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (702), the method 700 can include obtaining an optimized machine-learned graph model and portion assignment data. For instance, a computing system (e.g., vehicle computing system 110) can obtain and implement the optimized machine-learned graph model onboard an autonomous vehicle according to portion assignment data. For example, the vehicle computing system (e.g., an autonomous vehicle computing system, etc.) can include a plurality of computation resources that include a respective plurality of processing capabilities. The computation resources and associated processing capabilities can be the same or substantially similar to those described previously. The computing system can obtain an optimized machine-learned graph model (e.g., the optimized graph model of portion 614 of the method 600B, etc.). For example, the graph model may be accessed, received, retrieved, downloaded, stored, etc. onto the autonomous vehicle computing system (e.g., from an off-board repository, etc.). The graph model can include the plurality of portions, and can further include and/or be obtained in association with portion assignment data. The portion assignment data can describe an assignment of each of the portions to a respective computation resource.

The portion assignment data can be based at least in part on the plurality of processing capabilities of the computation resources and a minimum processing capability for each of the portions of the model. More particularly, the assignment data can include assignments of the portions to various computation resources such that the portions are assigned to computation resources that are sufficiently capable of processing the assigned portions. As an example, the portion assignment data can describe an assignment of a first portion with a minimum processing capability including a floating point precision of 64 bits to a computation resource with a processing capability including a floating point precision of 64 bits.

At (704), the method 700 can include obtaining input data from systems of an autonomous vehicle associated with a vehicle processing task. For instance, a computing system (e.g., vehicle computing system 110) can obtain input data from one or more systems of the vehicle 105 (e.g., perception system 170A, prediction system 170B, motion planning system 170C, remote computing system 190B, operations computing system 190A, sensor system 135, secondary vehicle computing system, autonomy computing system 140, etc.). The input data can be associated with an autonomous vehicle task. As an example, the input data can be associated with a perception task (e.g., a task to perceive an environment about the autonomous vehicle, etc.). As another example, the input data can be associated with a prediction task (e.g., a task to predict future event(s) regarding the environment or one or more objects about the autonomous vehicle, etc.). As yet another example, the input data can be associated with a motion planning task (e.g., a task to plan the motion of the vehicle in response to perceived and/or predicted event(s) regarding the environment or one or more objects about the autonomous vehicle, etc.).

At (706), the method 700 can include processing the input data with the graph model based on the portion assignment data to obtain output data. For instance, a computing system (e.g., vehicle computing system 110) can process the input data with the optimized machine-learned graph model based at least in part on the portion assignment data to obtain output data. The output data can be associated with the autonomous vehicle processing task. As an example, the autonomous vehicle processing task can be a perception task and the output data can be perception data (e.g., identification of object(s) in an environment about the autonomous vehicle, etc.). As another example, the autonomous vehicle processing task can be a prediction task and the output data can be prediction data (e.g., predicted movement of the one or more objects perceived in the environment about the autonomous vehicle, etc.). As yet another example, the autonomous vehicle processing task can be a motion planning task and the output data can be motion planning data (e.g., data to control motion of the autonomous vehicle in response to the predicted movement of object(s) perceived to be in the environment about the autonomous vehicle, etc.).

In some implementations, the computing system can process the input data with the optimized machine-learned graph model by processing each portion of the model with the computation resource that is assigned to each portion by the portion assignment data. As an example, a first portion can be assigned to a first computation resource and a second portion can be assigned to a second computation resource. The first portion can be processed with the first computation resource and the second portion can be processed by the second computation resource.

At (708A), the method 700 can include providing the output data to one or more additional systems of the autonomous vehicle. For instance, a computing system (e.g., vehicle computing system 110) can provide the output data to one or more additional systems of the autonomous vehicle. As an example, the motion planning data can be provided to a vehicle control system (e.g., and/or an associated intermediate interface, etc.) of the autonomous vehicle to control the autonomous vehicle in accordance with the motion planning data.

At (708B), the method 700 can include providing data descriptive of a processing performance of the computation resources to a computing system associated with a service entity. It should be noted that the operations associated with portion 708B can occur concurrently or subsequently to the operations associated with portion 708A of method 700. For instance, a computing system (e.g., vehicle computing system 110) can provide data descriptive of the processing performance of the computation resources to a computing system associated with a service entity (e.g., operations computing system 190A of service entity 185). Further, the autonomous vehicle processing task can be associated with a service provided and/or facilitated by the service entity. As an example, the service entity can facilitate an autonomous vehicle service (e.g., a transportation service, delivery service, rideshare service, etc.). The autonomous vehicle task can be associated with the autonomous vehicle service (e.g., a motion planning task for operating the autonomous vehicle to fulfill the autonomous vehicle service). The computing system to which the data is provided can be associated with the service entity. For example, the computing system may be a computing system utilized by the service entity to optimize the optimized machine-learned graph model and to generate the portion assignment data (e.g., according to the methods of the present disclosure, etc.).

At (710B), the method 700 can include obtaining an updated machine-learned graph model and/or updated portion assignment data. For instance, a computing system (e.g., vehicle computing system 110) can, in response to providing the data descriptive of the processing performance, obtain an updated machine-learned graph model different from the first optimized model and/or updated portion assignment data different than the portion assignment data. As an example, the provided data may indicate a poor processing performance associated with the processing of a first portion by a first computation resource. In response, the updated assignment data can reassign the first portion to a different computation resource. Alternatively, or additionally, the updated machine-learned graph model may include further optimizations to the optimized model. To follow the previous example, the updated machine-learned graph model may include an increased minimum processing capability for the first portion and/or may have compressed the first portion (e.g., consolidated one or more neural network layers, reassigned one or more neural units from the first portion to a different portion, etc.).

Figure 8:
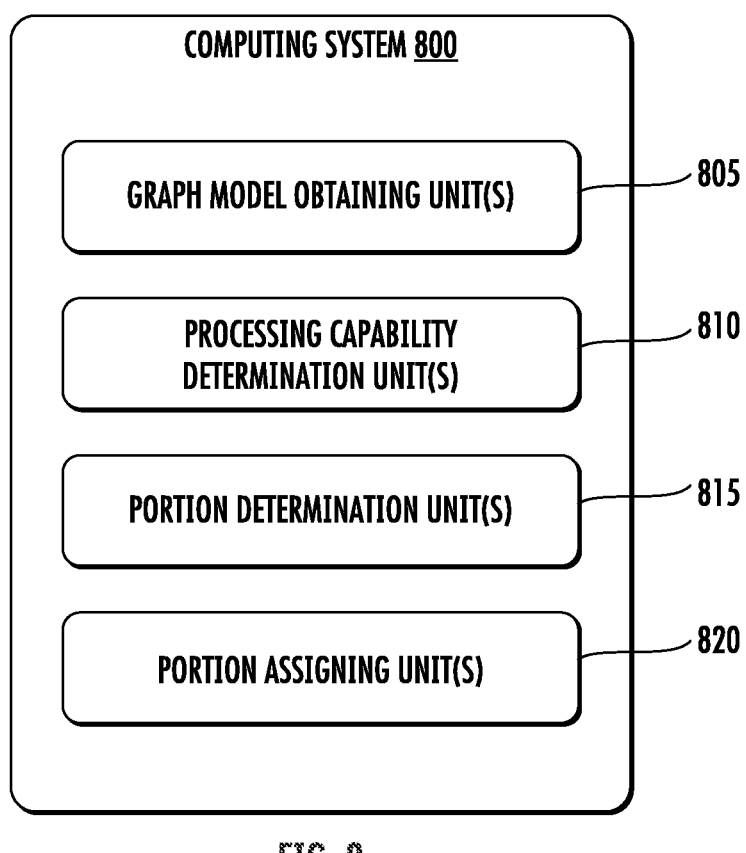
FIG. 8 depicts example system units for performing operations and functions according to example embodiments of the present disclosure.

Various means can be configured to perform the methods and processes described herein. FIG. 8 depicts example units associated with a computing system for performing operations and functions according to example embodiments of the present disclosure. As depicted, FIG. 8 depicts a computing system 800 that can include, but is not limited to, graph model obtaining unit(s) 805; processing capability determination unit(s) 810; portion determination unit(s) 815; and portion assigning unit(s) 820.

In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein (including the claims). For instance, the means can be configured to obtain a graph model (e.g., a machine-learned graph neural network, etc.). A graph model obtaining unit 805 is an example of means for obtaining a machine-learned graph model as described herein.

The means can be configured to determine a processing capability for a plurality of a respective plurality of computation resources. For example, the means can be configured to determine that each of a plurality of computation resources has a certain processing capability. A processing capability determination unit 810 is one example of a means for determining a processing capability for a plurality of a respective plurality of computation resources as described herein.

The means can be configured to determine a plurality of portions from a machine-learned graph model. For example, the means can be configured to segregate a machine-learned graph neural network into subsets of network nodes. A portion determination unit 815 is one example of a means for determining a plurality of portions from a machine-learned graph model as described herein.

The means can be configured to assign a plurality of portions of a machine-learned graph model to a plurality of computation resources. For example, the means can be configured to assign each of the plurality of machine-learned portions to a respective computation resource of the plurality of computation resources. A portion assigning unit 820 is one example of a means for assigning a plurality of portions of a machine-learned graph model to a plurality of computation resources as described herein.

Figure 9:
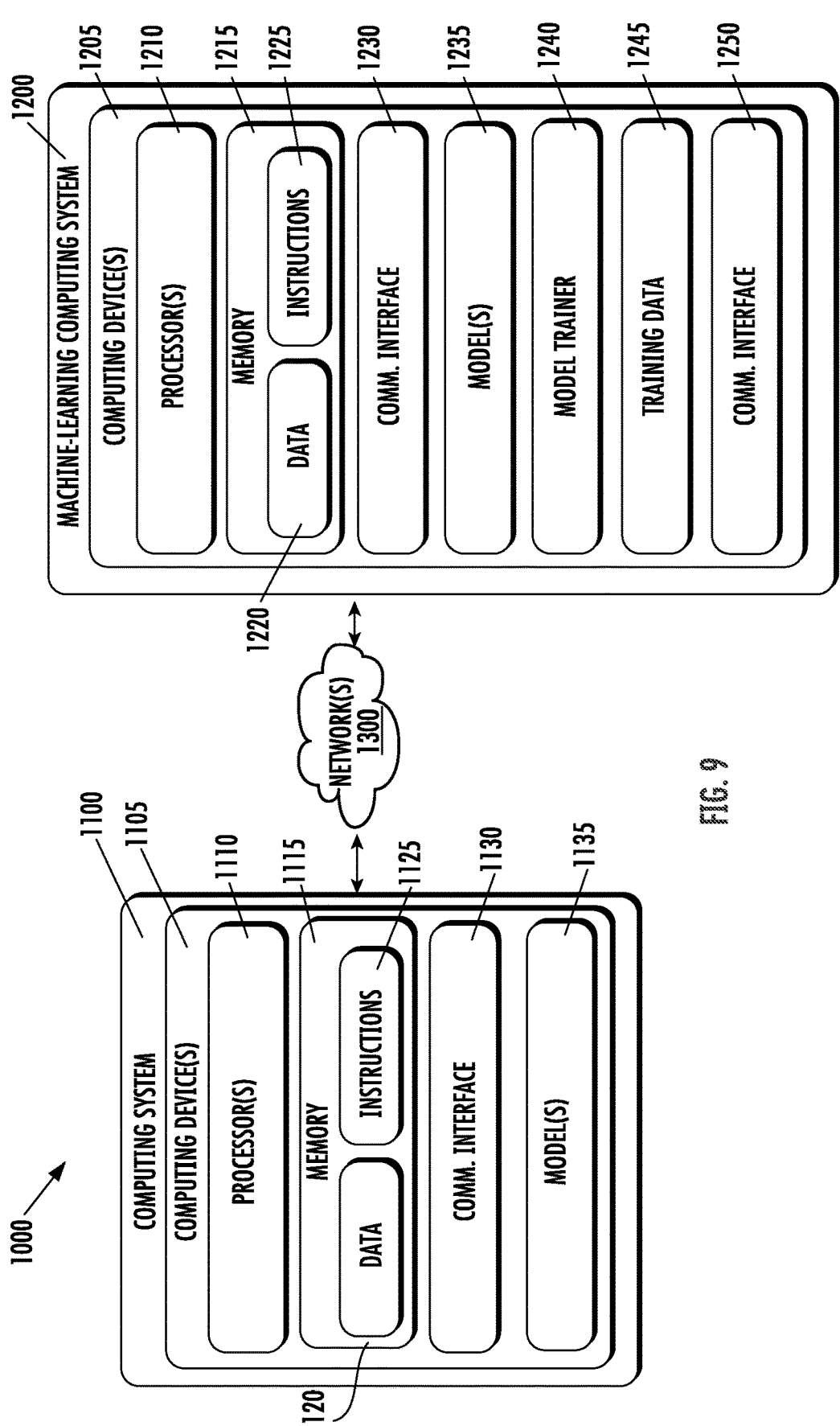
FIG. 9 depicts example system components of an example system according to example embodiments of the present disclosure.

FIG. 9 depicts a block diagram of an example computing system 1000 according to example embodiments of the present disclosure. The example system 1000 includes a computing system 1100 and a machine learning computing system 1200 that are communicatively coupled over one or more networks 1300.

In some implementations, the computing system 1100 can perform distributed processing of a segregated machine-learned graph model. In some implementations, the computing system 1100 can be included in an autonomous vehicle. For example, the computing system 1100 can be on-board the autonomous vehicle. In other implementations, the computing system 1100 is not located on-board the autonomous vehicle. For example, the computing system 1100 can be or otherwise include one or more remote backend services that can perform distributed processing of a segregated graph model to obtain an output associated with provision of the remote backend service(s). The computing system 1100 can include one or more distinct physical computing devices.

The computing system 1100 can include computing device(s) 1105, which can include one or more processors 1110 and a memory 1115. The one or more processors 1110 can be any suitable processing device (e.g., a processor core, a microprocessor, an ASIC, a FPGA, a controller, a micro-controller, a graphics processing unit, an accelerator, a tensor processing unit, etc.) and can be one processor or a plurality of processors that are operatively connected. The memory 1115 can include one or more non-transitory computer-readable storage media, such as RAM, ROM, EEPROM, EPROM, one or more memory devices, flash memory devices, etc., and combinations thereof.

The processor(s) and/or memory 1115 can be included in a plurality of computation resources of the computing system 1100. More particularly, computing devices (e.g., FPGAs, CPUs, CPU cores, GPUs, etc.) and/or processors of the computing system 1000 can be dynamically partitioned as computation resource(s). As an example, the computation resource(s) 402 could be or otherwise include one or more of the processor(s) 1110 (e.g., an FPGA, a GPU and a CPU, etc.). The computation resources could then be dynamically partitioned to further include one or more cores of a central processing unit. Other resources (e.g., FPGAs, memory 1115, etc.) could be included in a different computation resource. Dynamic partitioning of various computing devices or portions of computing devices into a computation resource can be based on a variety of factors, including but not limited to available hardware resources, hardware failure(s), anticipated (e.g., predicted) processing operation(s), received data types and/or quantities, etc. of the computing system 1100.

The memory 1115 can store information that can be accessed by the one or more processors 1110. For instance, the memory 1115 (e.g., one or more non-transitory com-puter-readable storage mediums, memory devices) can store data 1120 that can be obtained, received, accessed, written, manipulated, created, and/or stored. The data 1120 can include, for instance, a segregated machine-learned model (e.g., an optimized machine-learned graph model, etc.) that includes a plurality of portions (e.g., optimized portions of a graph model, etc.), alongside portion assignment data that describes assignments of the portions to respective computation resources (e.g., groupings of processors 1110) of the computing system 1100 as described herein. In some implementations, the computing system 1100 can obtain data from one or more memory device(s) that are remote from the computing system 1100. As an example, the computing system 1100 can receive an optimized machine-learned graph model and portion assignment data from the machine-learning computing system 1200 via network(s) 1300 (e.g., utilizing communication interface 1130, etc.).

The memory 1115 can also store computer-readable instructions 1125 that can be executed by the one or more processors 1120. The instructions 1125 can be software written in any suitable programming language or can be implemented in hardware. Additionally, or alternatively, the instructions 1125 can be executed in logically and/or virtually separate threads on processor(s) 1110.

For example, the memory 1115 can store instructions 1125 that when executed by the one or more processors 1110 cause the one or more processors 1110 (the computing system) to perform any of the operations and/or functions described herein, including, for example, processing the obtained plurality of portions of the graph model with the computation resources of the computing system 1100 according to the obtained portion assignment data (e.g., processing a first portion with a first computation resource based on a described assignment of the portion assignment data, etc.).

According to an aspect of the present disclosure, the computing system 1100 can store or include one or more machine-learned models 1135. As examples, the machine-learned models 1135 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

More particularly, the model(s) 1135 can include one or more graph models. Graph model(s) (e.g., graph neural networks, etc.), can include deep learning graph neural networks. Additionally, or alternatively, a graph model can be a model utilizing a model architecture that includes a plurality of machine-learned models organized as a directed graph. As an example, the machine-learned graph model can be associated with an autonomous vehicle processing task such as perception, and the machine-learned graph model can include a plurality of trained models (e.g., convolutional neural network(s), recurrent neural network(s), SVMs, etc.) that are configured to generate outputs associated with a plurality of perception subtasks. The graph model can organize communication between the trained models so that outputs from one model can be obtained and processed by a next node of the graph (e.g., a model) according to the edges connecting the nodes. In such fashion, the graph model can, in some implementations, include a plurality of trained models, and can be distributed across a plurality of computation resources such that each resource processes a trained model. Additionally, or alternatively, in some implementations, each of the plurality of trained models organized in the graph model architecture can be further segregated into portions, such that each model includes a plurality of portions that can be processed by a respective computation resource of the computing system 1100.

In some implementations, the computing system 1100 can receive the one or more machine-learned models 1135 from the machine learning computing system 1200 over network(s) 1300 and can store the one or more machine-learned models 1135 in the memory 1115. The computing system 1100 can then use or otherwise implement the one or more machine-learned models 1135 (e.g., by processor(s) 1110). In particular, the computing system 1100 can implement the machine learned model(s) 1135 to perform distributed processing of the graph model to obtain an output (e.g., an output associated with an autonomous vehicle processing task, etc.).

The machine learning computing system 1200 can include one or more computing devices 1205. The machine learning computing system 1200 can include one or more processors 1210 and a memory 1215. The one or more processors 1210 can be any suitable processing device (e.g., a processor core, a microprocessor, an ASIC, a FPGA, a controller, a microcontroller, etc.) and can be one processor or a plurality of processors that are operatively connected. The memory 1215 can include one or more non-transitory computer-readable storage media, such as RAM, ROM, EEPROM, EPROM, one or more memory devices, flash memory devices, etc., and combinations thereof.

The memory 1215 can store information that can be accessed by the one or more processors 1210. For instance, the memory 1215 (e.g., one or more non-transitory computer-readable storage mediums, memory devices) can store data 1220 that can be obtained, received, accessed, written, manipulated, created, and/or stored. The data 1220 can include, for instance, the graph model and/or portion assignment data as described herein. In some implementations, the machine learning computing system 1200 can obtain data from one or more memory device(s) that are remote from the machine learning computing system 1200.

The memory 1215 can also store computer-readable instructions 1225 that can be executed by the one or more processors 1210. The instructions 1225 can be software written in any suitable programming language or can be implemented in hardware. Additionally, or alternatively, the instructions 1225 can be executed in logically and/or virtually separate threads on processor(s) 1210.

For example, the memory 1215 can store instructions 1225 that when executed by the one or more processors 1210 cause the one or more processors 1210 (the computing system) to perform any of the operations and/or functions described herein, including, for example, segregation of a graph model, generation of portion assignment data, etc.

In some implementations, the machine learning computing system 1200 includes one or more server computing devices. If the machine learning computing system 1200 includes multiple server computing devices, such server computing devices can operate according to various computing architectures, including, for example, sequential computing architectures, parallel computing architectures, or some combination thereof.

In addition to, or alternatively to the model(s) 1235 at the computing system 1100, the machine learning computing system 1200 can include one or more machine-learned models 1235. As examples, the machine-learned models

1235 can be or can otherwise include various machine-learned models such as, for example, the model(s) 1135 obtained by the computing system 110 from the machine-learning computing system 1200.

As an example, the machine learning computing system 1200 can communicate with the computing system 1100 according to a client-server relationship. For example, the machine learning computing system 1200 can implement the machine-learned models 1235 to provide a web service to the computing system 1100. For example, the web service can provide a method for segregation and optimization of machine-learned models. As an example, the computing system 1100 can provide a graph model (e.g., model(s) 1135) to the machine-learning computing system 1200. The machine-learning computing system 1200 can obtain the graph model and segregate the graph model into a plurality of portions (e.g., utilizing model trainer 1240, etc.). The machine-learning computing system 1200 can additionally assign each of the portions to a computation resource of the computing system (e.g., computing device(s) 1105, etc.), and the assignments can be described by portion assignment data (e.g., stored in memory 1215). The portions of the graph model and the portion assignment data can be provided to the computing system 1100. Additionally, the machine-learned computing system 1200 can iteratively communicate with the computing system 1100 to optimize the distribution of the graph model based on processing performance of the computation resources (e.g., computing device(s) 1105) of the computing system 1100 (e.g., as described with reference to the method 700 of FIG. 7).

Thus, machine-learned models 1135 can be located and used at the computing system 1100 and/or machine-learned models 1235 can be located and used at the machine learning computing system 1200.

In some implementations, the machine learning computing system 1200 and/or the computing system 1100 can train the machine-learned models 1135 and/or 1235 through use of a model trainer 1240. The model trainer 1240 can train the machine-learned models 1135 and/or 1240 using one or more training or learning algorithms. One example training technique is backwards propagation of errors. In some implementations, the model trainer 1240 can perform supervised training techniques using a set of labeled training data. In other implementations, the model trainer 1240 can perform unsupervised training techniques using a set of unlabeled training data. The model trainer 1240 can perform a number of generalization techniques to improve the generalization capability of the models being trained. Generalization techniques include weight decays, dropouts, or other techniques.

It should be noted that the graph model of the present embodiments can be trained at the machine-learning computing system 1200 prior to inference-phase utilization of the model and/or segregation of the model. As such, segregation of model(s) by the computing system 1200 will generally occur subsequently to training and optimization of the unsegregated models using the model trainer 1240 and the training data 1245.

In particular, the model trainer 1240 can train a machine-learned model 1135 and/or 1235 based on a set of training data 1245. The model trainer 1240 can be implemented in hardware, firmware, and/or software controlling one or more processors.

The computing system 1100 and the machine learning computing system 1200 can each include a communication interface 1130 and 1250, respectively. The communication interfaces 1130/1250 can used to communicate with one or more systems or devices, including systems or devices that are remotely located from the computing system 1100 and the machine learning computing system 1200. A communication interface 1130/1250 can include any circuits, components, software, etc. for communicating with one or more networks (e.g., 1300). In some implementations, a communication interface 1130/1250 can include, for example, one or more of a communications controller, receiver, transceiver, transmitter, port, conductors, software and/or hardware for communicating data.

The network(s) 1300 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1300 can be accomplished, for instance, via a network interface using any type of protocol, protection scheme, encoding, format, packaging, etc.

FIG. 9 illustrates one example computing system 1000 that can be used to implement the present disclosure. Other computing systems can be used as well. For example, in some implementations, the computing system 1100 can include the model trainer 1240 and the training dataset 1245. In such implementations, the machine-learned models 1240 can be both trained and used locally at the computing system 1100. As another example, in some implementations, the computing system 1100 is not connected to other computing systems.

In addition, components illustrated and/or discussed as being included in one of the computing systems 1100 or 1200 can instead be included in another of the computing systems 1100 or 1200. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for editing a machine-learned model to facilitate distributed processing, the method comprising:

obtaining, by a computing system comprising one or more computing devices, a machine-learned graph model comprising a plurality of connected nodes;

determining, by the computing system, a plurality of processing capabilities for a respective plurality of computation resources of a vehicle computing system onboard an autonomous vehicle;

determining, by the computing system, a plurality of portions from the machine-learned graph model, wherein each of the plurality of portions comprises a respective subset of the plurality of nodes and a minimum processing requirement;

assigning, by the computing system, each of the plurality of portions to a respective computation resource of the plurality of computation resources onboard the autonomous vehicle based at least in part on the minimum processing requirement of a respective portion and the processing capability of the respective computation resource; and providing, by the computing system, each of the plurality of portions to a respective computation resource to which the portion is assigned, wherein the plurality of computation resources are configured to process the plurality of portions.

2. The computer-implemented method of claim 1, wherein the method further comprises:

generating, by the computing system for each of the plurality of portions, one or more connections between the portion and one or more other portions to obtain a reconstructed machine-learned graph model; and providing, by the computing system, the reconstructed machine-learned graph model to the plurality of computation resources, wherein the plurality of computation resources is configured to process the reconstructed machine-learned graph model.

3. The computer-implemented method of claim 1, wherein the method further comprises:

obtaining, by the computing system, data descriptive of a processing performance of each of the plurality of computation resources; and applying, by the computing system, one or more optimizations to one or more portions of the plurality of portions to obtain an optimized machine-learned graph model, wherein the one or more optimizations are based at least in part on the processing performance of one or more computation resources assigned to the one or more portions.

4. The computer-implemented method of claim 3, wherein the method further comprises:

providing, by the computing system, the optimized machine-learned graph model to the plurality of computation resources for processing; and obtaining, by the computing system, data indicative of an updated processing performance of at least one of the plurality of computation resources, the updated processing performance of the at least one computation resource being different than the processing performance of the at least one computation resource.

5. The computer-implemented method of claim 3, wherein the one or more optimizations comprise at least one of:

adjusting, by the computing system, the minimum processing requirement of each of the one or more portions; or compressing, by the computing system, the subset of nodes of each of the one or more portions.

6. The computer-implemented method of claim 3, wherein:

for each of the plurality of portions, the one or more optimizations are further based at least in part on an autonomous vehicle processing task respectively associated with the portion; and the autonomous vehicle processing task comprises at least one of:

a sensor data preprocessing task, wherein sensor data comprises image data, LIDAR data, RADAR data, heat sensor data, or ultrasonic sensor data;

a sensor data processing task;

a segmentation task a detection task an estimation task; or one or more mathematical operations.

7. The computer-implemented method of claim 1, wherein:

each of the plurality of nodes is connected to at least one other node of the plurality of nodes with at least one respective node connection; and each of the plurality of nodes comprises one or more neural units of a neural network.

8. The computer-implemented method of claim 1, wherein:

the subset of nodes of a first portion of the plurality of portions comprises a first node and a second node;

the minimum processing requirement of the first node is higher than the minimum processing requirement of the second node; and the minimum processing requirement of the first portion is equivalent to the minimum processing requirement of the first node.

9. The computer-implemented method of claim 1, wherein each of the plurality of computation resources comprises at least a portion of at least one of:

an application-specific integrated circuit;

a memory;

a processor;

a processor core;

a field-programmable gate array;

an accelerator;

a tensor processing unit; or a graphics processing unit.

10. The computer-implemented method of claim 1, wherein each of the plurality of processing capabilities and the plurality of processing capabilities comprises at least one of:

a floating point precision;

a processing throughput;

an output accuracy; or a processing latency.

11. A computing system of an autonomous vehicle, comprising:

a plurality of computation resources comprising a respective plurality of processing capabilities;

one or more tangible, non-transitory computer readable media storing computer-readable instructions that when executed by at least one of the plurality of computation resources cause the at least one of the plurality of computation resources to perform operations, the operations comprising:

obtaining an optimized machine-learned graph model comprising a plurality of portions and portion assignment data descriptive of an assignment of each of the plurality of portions to a respective computation resource of the plurality of computation resources, wherein the plurality of portions are associated with a respective plurality of minimum processing capabilities, wherein the portion assignment data is based at least in part on the plurality of processing capabilities and the plurality of minimum processing capabilities;

obtaining input data from one or more systems of the autonomous vehicle, wherein the input data is associated with an autonomous vehicle processing task;

processing, using the respective computation resources of the plurality of computation resources of the computing system of the autonomous vehicle, the input data with the optimized machine-learned graph model based at least in part on the portion assignment data to obtain output data associated with the autonomous vehicle processing task; and providing the output data to one or more additional systems of the autonomous vehicle.

12. The computing system of claim 11, wherein processing the input data with the optimized machine-learned graph model based at least in part on the portion assignment data comprises processing each of the plurality of portions with the computation resource to which a respective portion is assigned by the portion assignment data to obtain the output data associated with the autonomous vehicle processing task.

13. The computing system of claim 11, wherein the operations further comprise:

providing data descriptive of a processing performance of each of the plurality of computation resources to a computing system associated with a service entity; and in response to providing the data descriptive of the processing performance, obtaining at least one of an updated machine-learned graph model different than the optimized machine-learned graph model or updated portion assignment data different than the portion assignment data.

14. The computing system of claim 11, wherein the autonomous vehicle task comprises at least one of:

a perception task;

a prediction task; or a motion planning task.

15. The computing system of claim 11, wherein the autonomous vehicle processing task is associated with a service of the service entity.

16. The computing system of claim 11, wherein each of the plurality of computation resources comprises at least a portion of at least one of:

an application-specific integrated circuit;

a memory;

a processor;

a processor core;

a field-programmable gate array;

an accelerator;

a tensor processing unit; or a graphics processing unit.

17. The computing system of claim 11, wherein a processing capability and a minimum processing requirement comprises at least one of:

a floating point precision;

a processing throughput;

an output accuracy; or a processing latency.

18. One or more tangible, non-transitory computer readable media storing computer-readable instructions that when executed by one or more processors cause the one or more processors to perform operations, the operations comprising:

obtaining a graph model comprising a plurality of connected nodes;

determining a plurality of processing capabilities for a respective plurality of computation resources of a vehicle computing system onboard an autonomous vehicle;

determining a plurality of portions from the graph model, wherein each of the plurality of portions comprises a respective subset of the plurality of nodes and a minimum processing requirement;

assigning each of the plurality of portions to a respective computation resource of the plurality of computation resources of the vehicle computing system onboard the autonomous vehicle based at least in part on the minimum processing requirement of a respective portion and the processing capability of the respective computation resource; and providing each of the plurality of portions to a respective computation resource to which the portion is assigned, wherein the respective computation resource is configured to process the respective portion.

19. The one or more tangible, non-transitory computer readable media of claim 18, wherein the operations further comprise:

generating, for each of the plurality of portions, one or more connections between the portion and one or more other portions to obtain a reconstructed graph model;

providing the reconstructed graph model to the plurality of computation resources, wherein the plurality of computation resources is configured to process the reconstructed graph model;

obtaining data descriptive of a processing performance of each of the plurality of computation resources;

applying one or more optimizations to at least one portion of the plurality of portions to obtain an optimized graph model, wherein the one or more optimizations are based at least in part on the processing performance of one or more computation resources assigned to the at least one portions;

providing the optimized graph model to the plurality of computation resources for processing; and obtaining data indicative of an updated processing performance of each of the plurality of computation resources, the updated processing performance being different than the processing performance.

* * * * *